US012493500B2

(12) United States Patent
Jubinski et al.

(10) Patent No.: US 12,493,500 B2
(45) Date of Patent: *Dec. 9, 2025

(54) CROSS-CLOUD ORCHESTRATION OF DATA ANALYTICS FOR A PLURALITY OF RESEARCH DOMAINS

(71) Applicant: THE MITRE CORPORATION, McLean, VA (US)

(72) Inventors: Joseph Peter Jubinski, Sykesville, VA (US); Ransom Kershaw Winder, Hanover, MD (US); Angela McIntee O'Hanlon, Alexandria, VA (US); Nathan Louis Giles, Odenton, MD (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,053

(22) Filed: Jul. 15, 2024

(65) Prior Publication Data

US 2024/0370311 A1 Nov. 7, 2024

Related U.S. Application Data

(63) Continuation of application No. 17/025,285, filed on Sep. 18, 2020, now Pat. No. 12,039,376, which is a
(Continued)

(51) Int. Cl.
*G06F 16/20* (2019.01)
*G06F 9/48* (2006.01)
(Continued)

(52) U.S. Cl.
CPC .......... *G06F 9/5083* (2013.01); *G06F 9/4881* (2013.01); *G06F 9/5038* (2013.01);
(Continued)

(58) Field of Classification Search
None
See application file for complete search history.

(56) References Cited

U.S. PATENT DOCUMENTS

| 7,272,820 B2 * | 9/2007 | Klianev | G06F 8/34 717/109 |
| 9,229,952 B1 | 1/2016 | Meacham et al. | |

(Continued)

FOREIGN PATENT DOCUMENTS

WO    WO 2007/059287 A1    5/2007

OTHER PUBLICATIONS

Agrawal, R. and Kiernan, J., "Watermarking Relational Databases," Proceedings of the 28th International Conference on Very Large Data Bases (VLDB '02), Hong Kong, China, 12 pages (2002).
(Continued)

*Primary Examiner* — Belix M Ortiz Ditren
(74) *Attorney, Agent, or Firm* — Sterne, Kessler, Goldstein & Fox P.L.L.C.

(57) ABSTRACT

A system, apparatus, article of manufacture, method, and/or computer program product are disclosed for a cross-cloud orchestration of data analytics for a plurality of research domains. A system operates by receiving one or more command and control (C&C) requests to execute one or more analytic applications of a workflow. The workflow includes the analytic applications for execution. The system further operates by generating one or more native access requests to execute the analytic applications at one or more analytics computing environments, and transmitting one or more native access requests to the analytics computing environments, wherein at least two native access requests are configured for different access protocol.

20 Claims, 12 Drawing Sheets

Related U.S. Application Data continuation of application No. 16/454,887, filed on Jun. 27, 2019, now Pat. No. 10,824,479, which is a continuation of application No. 14/871,302, filed on Sep. 30, 2015, now Pat. No. 10,360,072.

(51) Int. Cl.
| | | |
|---|---|---|
| *G06F 9/50* | (2006.01) | |
| *G06F 9/54* | (2006.01) | |
| *G06F 16/2457* | (2019.01) | |
| *G06F 16/25* | (2019.01) | |
| *G06F 16/951* | (2019.01) | |

(52) U.S. Cl.
CPC .......... *G06F 9/542* (2013.01); *G06F 16/2457* (2019.01); *G06F 16/24575* (2019.01); *G06F 16/25* (2019.01); *G06F 16/951* (2019.01)

(56) References Cited

U.S. PATENT DOCUMENTS

| | | | |
|---|---|---|---|
| 10,338,973 | B2 | 7/2019 | Jubinski et al. |
| 10,360,072 | B2 | 7/2019 | Jubinski et al. |
| 2002/0194181 | A1 | 12/2002 | Wachtel |
| 2004/0162741 | A1 | 8/2004 | Flaxer et al. |
| 2006/0053382 | A1 | 3/2006 | Gardner et al. |
| 2007/0011155 | A1 | 1/2007 | Sarkar |
| 2008/0256549 | A1 | 10/2008 | Liu et al. |
| 2009/0138415 | A1 | 5/2009 | Lancaster |
| 2009/0241117 | A1 | 9/2009 | Dasgupta et al. |
| 2010/0070463 | A1 | 3/2010 | Zhao et al. |
| 2011/0083037 | A1 | 4/2011 | Bocharov et al. |
| 2011/0276977 | A1 | 11/2011 | van Velzen et al. |
| 2012/0030202 | A1 | 2/2012 | B'Far et al. |
| 2013/0086116 | A1* | 4/2013 | Agarwal .............. G06F 16/211 707/792 |
| 2013/0205028 | A1 | 8/2013 | Crockett et al. |
| 2013/0246996 | A1 | 9/2013 | Duggal et al. |
| 2013/0339643 | A1 | 12/2013 | Tekade et al. |
| 2014/0089390 | A1 | 3/2014 | Chandra et al. |
| 2014/0280952 | A1* | 9/2014 | Shear ...................... H04L 63/10 709/226 |
| 2014/0337273 | A1 | 11/2014 | Bentley et al. |
| 2015/0248525 | A1 | 9/2015 | Ury et al. |
| 2017/0090994 | A1 | 3/2017 | Jubinski et al. |
| 2017/0090995 | A1 | 3/2017 | Jubinski et al. |

OTHER PUBLICATIONS

Alintas, I. et al., "Kepler: An Extensible System for Design and Execution of Scientific Workflows," Proceedings of the 16th International Conference on Scientific and Statistical Database Management, IEEE Computer Society, 2 pages (2004).

Allen, M.D. et al., "Capturing Provenance in the Wild," Lecture Notes in Computer Science: Provenance and Annotation of Data and Processes, vol. 6378, Springer-Verlag Berlin Heidelberg, pp. 98-101 (2010).

Apache Flume, http://flume.apache.org, as archived on The Wayback Machine at http://web.archive.org on Apr. 2, 2015, 6 pages.

Apache Sqoop, http://sqoop.apache.org, as archived on The Wayback Machine at http://web.archive.org on Mar. 26, 2015, 1 page.

Birke, R. et al., "(Big) Data in a Virtualized World: Volume, Velocity, and Variety in Cloud Datacenters," 12th USE NIX Conference on File and Storage Technologies, Santa Clara, CA, USENIX Association, pp. 177-189 (Feb. 17-20, 2014).

Chapman, A. et al., "PLUS: A Provenance Manager for Integrated Information," IEEE IRI2011, Las Vegas, Nevada, pp. 269-275 (Aug. 3-5, 2011).

Clarke, J. et al., "An NLP Curator (or: How I Learned to Stop Worrying and Love NLP Pipelines)," LREC, 8 pages (2012).

Cudré-Mauroux, P. et al., "Viewpoints on Emergent Semantics," Journal on Data Semantics VI, LNCS 4090, Springer-Verlag Berlin Heidelberg, pp. 1-27 (2006).

Cuenca-Grau, B. and Kutz, O., "Modular Ontology Languages Revisited," Proceedings of the Workshop on Semantic Web for Collaborative Knowledge Acquisition, 10 pages (Jan. 5, 2007).

Data to Decisions, The MITRE Corporation, http://www.mitre.org/research/mission-focused-research/data-to-decisions, as archived on The Wayback Machine at http://web.archive.org on Mar. 19, 2015, 2 pages.

Demchenko, Y. et al., "Addressing Big Data Issues in Scientific Data Infrastructure," International Conference on Collaboration Technologies and Systems, San Diego, CA, IEEE, pp. 48-55 (2013).

Grau, B.C. et al., "Working with Multiple Ontologies on the Semantic Web," The Semantic Web-ISWC 2004, Springer-Verlag Berlin Heidelberg, pp. 620-634 (2004).

Grossman, R.L., "What is Analytic Infrastructure and Why Should You Care?," SIGKDD Explorations Newsletter, vol. 11, Issue 1, ACM, pp. 5-9 (2009).

Guha, R.V., Contexts: A Formalization and Some Applications, Stanford University Thesis, Stanford, CA, pp. 1-146 (Feb. 10, 1995).

Laney, D., "3D Data Management: Controlling Volume, Velocity, and Variety," Application Delivery Strategies,, META Group, 4 pages (Feb. 6, 2001).

Lenat, D.B., "CYC: A Large-Scale Investment in Knowledge Infrastructure," Communications of the ACM, vol. 38, No. 11, pp. 33-38 (Nov. 1995).

Matuszek, C et al., "An Introduction to the Syntax and Content of Cyc"," AAAI Spring Symposium: Formalizing and Compiling Background Knowledge and Its Applications to Knowledge Representation and Question Answering, 6 pages (Mar. 27, 2006).

Mazurczyk, W. and Szczypiorski, K., "Is Cloud Computing Steganography-proof?," Third International Conference on Multimedia Information Networking and Security, Shanghai, 2 pages (2011).

Mcafee, A. & Brynjolfsson, E., "Big Data: The Management Revolution," Harvard Business Review, vol. 90, pp. 59-66, 68 (Oct. 2012).

Moreau, L. and Missier, P. (eds.), "PROV-DM: The PROV Data Model," World Wide Web Consortium, from http://www.w3.org/TR/2013/REC-prov-dm-20130403, 40 pages (Apr. 30, 2013).

Moreau, L. et al., "The Open Provenance Model Core Specification (vl. 1 )," Future Generation Computer Systems, vol. 27, No. 6, pp. 743-756 (2010).

Niles, I. and Pease, A., "Towards a Standard Upper Ontology," Proceedings of the International Conference on Formal Ontology in Information Systems, Ogunquit, Maine, USA, 8 pages (Oct. 17-19, 2001).

Papadimitriou, P. and Garcia-Molina, H., "Data Leakage Detection," IEEE Transactions on Knowledge and Data Engineering, vol. 23, No. 1, IEEE Computer Society, pp. 51-63 (2011).

Parent, C. et al., "Modularity in Databases," Modular Ontologies, Berlin, Springer-Verlag, pp. 113-153 (2009).

Shvaochko, K. et al., "The Hadoop Distributed File System," Mass Storage Systems and Technologies (MSST), 2010 IEEE 26th Symposium, pp. 1-10 (2010).

VSphere: Server Virtualization, Cloud Infrastructure, VMware, http://www.vmware.com/products/vsphere, as archived on The Wayback Machine at http://web.archive.org on Mar. 18, 2015, 3 pages.

Wang, Q. and Jin, H., "Data Leakage Mitigation for Discretionary Access Control in Collaboration Clouds," SACMAT'11, Innsbruck, Austria, pp. 103-112 (Jun. 15-17, 2011).

White, T., Hadoop: the Definitive Guide, Third Edition, ISBN: 978-1-449-31152-0, O'Reilly Media, Inc., USA, Chapter 1 (May 2012).

Winder, R. et al., Implementation Recommendations for MOSAIC: A Workflow Architecture for Analytic Enrichment, MITRE Technical Report MTR-MNI-000-012, pp. 1-60 (Jul. 2010).

Winder, R. et al., "MOSAIC: A Cohesive Method for Orchestrating Discrete Analytics in a Distributed Model," Natural Language Processing and Information Systems, Springer-Verlag, pp. 260-265 (Jun. 19-21, 2013).

(56) References Cited

OTHER PUBLICATIONS

Non-final Office Action, mailed Aug. 9, 2016, for U.S. Appl. No. 14/871,302, filed Sep. 30, 2015.
Non-final Office Action, mailed Feb. 22, 2017, for U.S. Appl. No. 14/871,302, filed Sep. 30, 2015.
Final Office Action, mailed Oct. 18, 2017, for U.S. Appl. No. 14/871,302, filed Sep. 30, 2015.
Non-final Office Action, mailed Aug. 10, 2018, for U.S. Appl. No. 14/871,302, filed Sep. 30, 2015.
Non-final Office Action, mailed May 3, 2017, for U.S. Appl. No. 14/871,263, filed Sep. 30, 2015.
Final Office Action, mailed Nov. 1, 2017, for U.S. Appl. No. 14/871,263, filed Sep. 30, 2015.
Non-final Office Action, mailed Aug. 10, 2018, for U.S. Appl. No. 14/871,263, filed Sep. 30, 2015.

\* cited by examiner

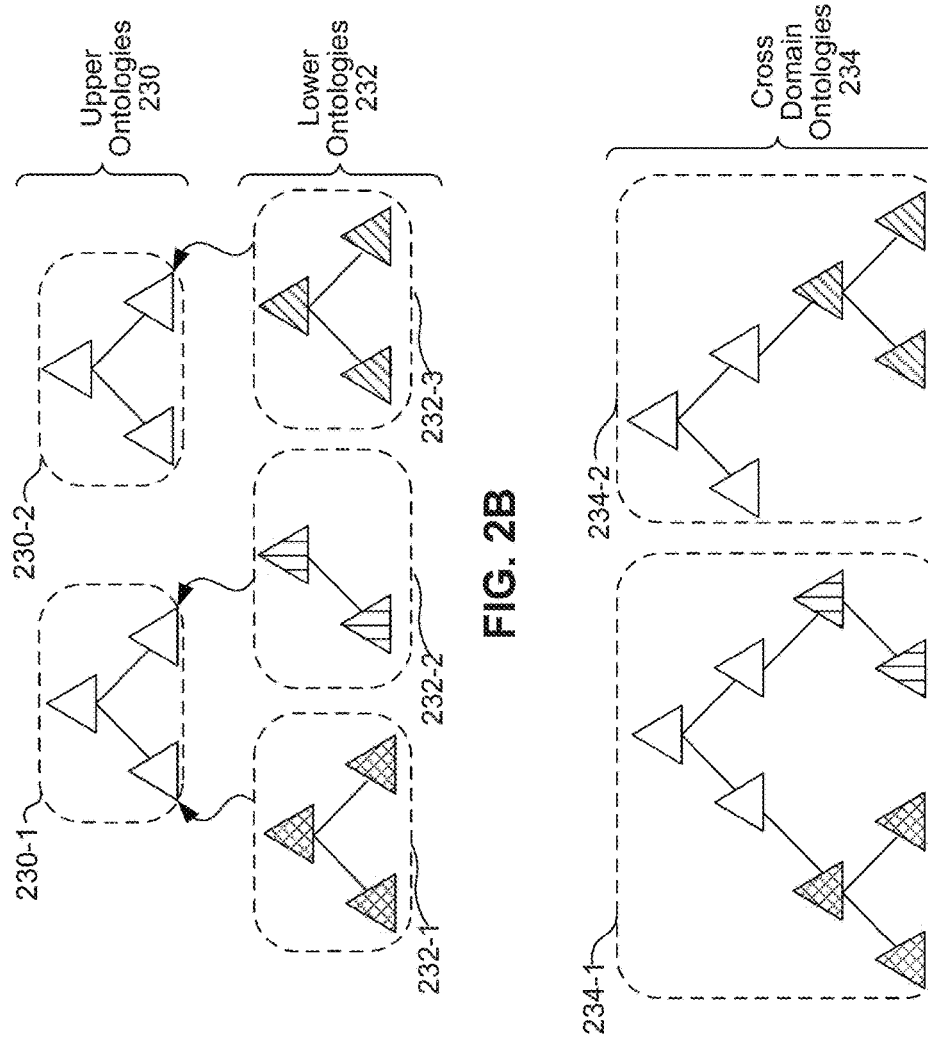
FIG. 2B
FIG. 2C
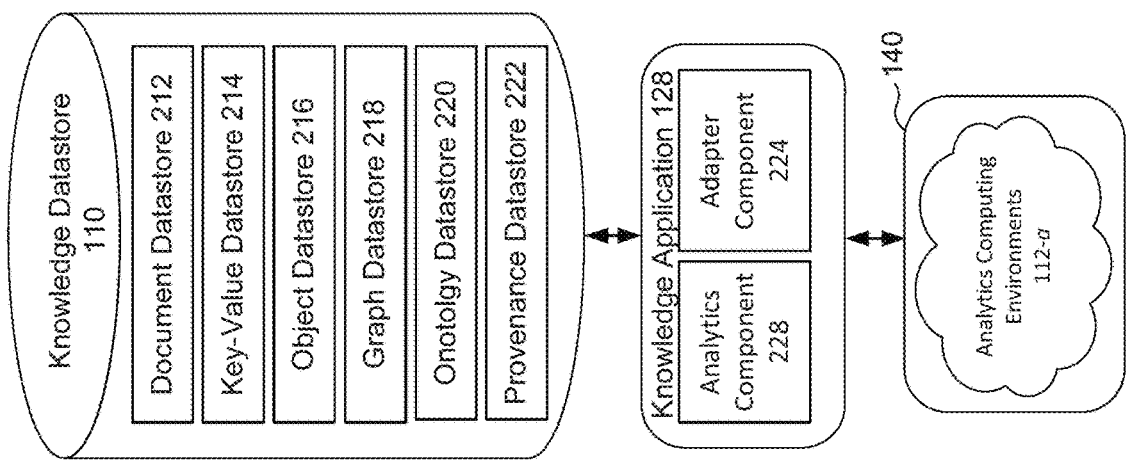
FIG. 2A

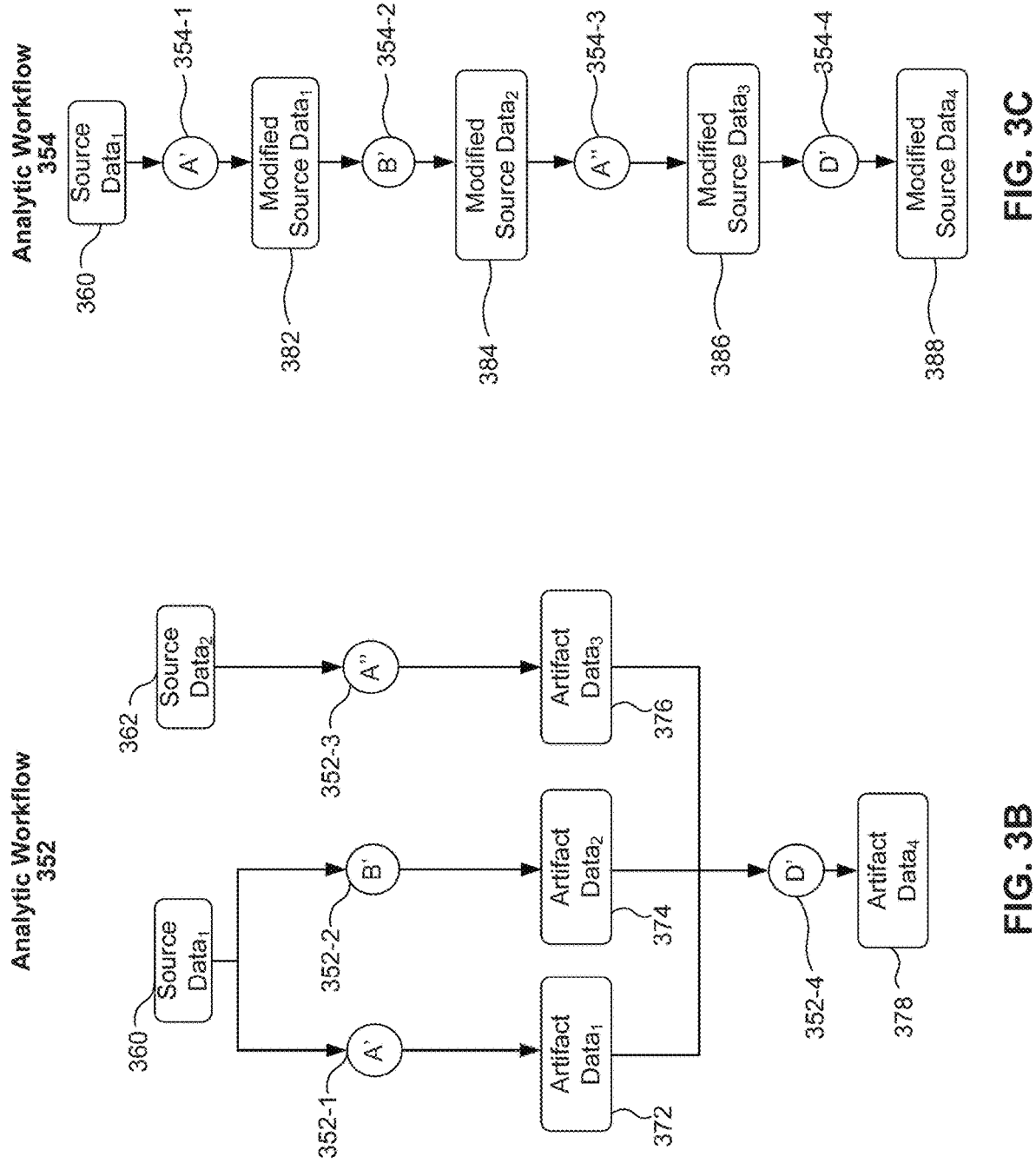

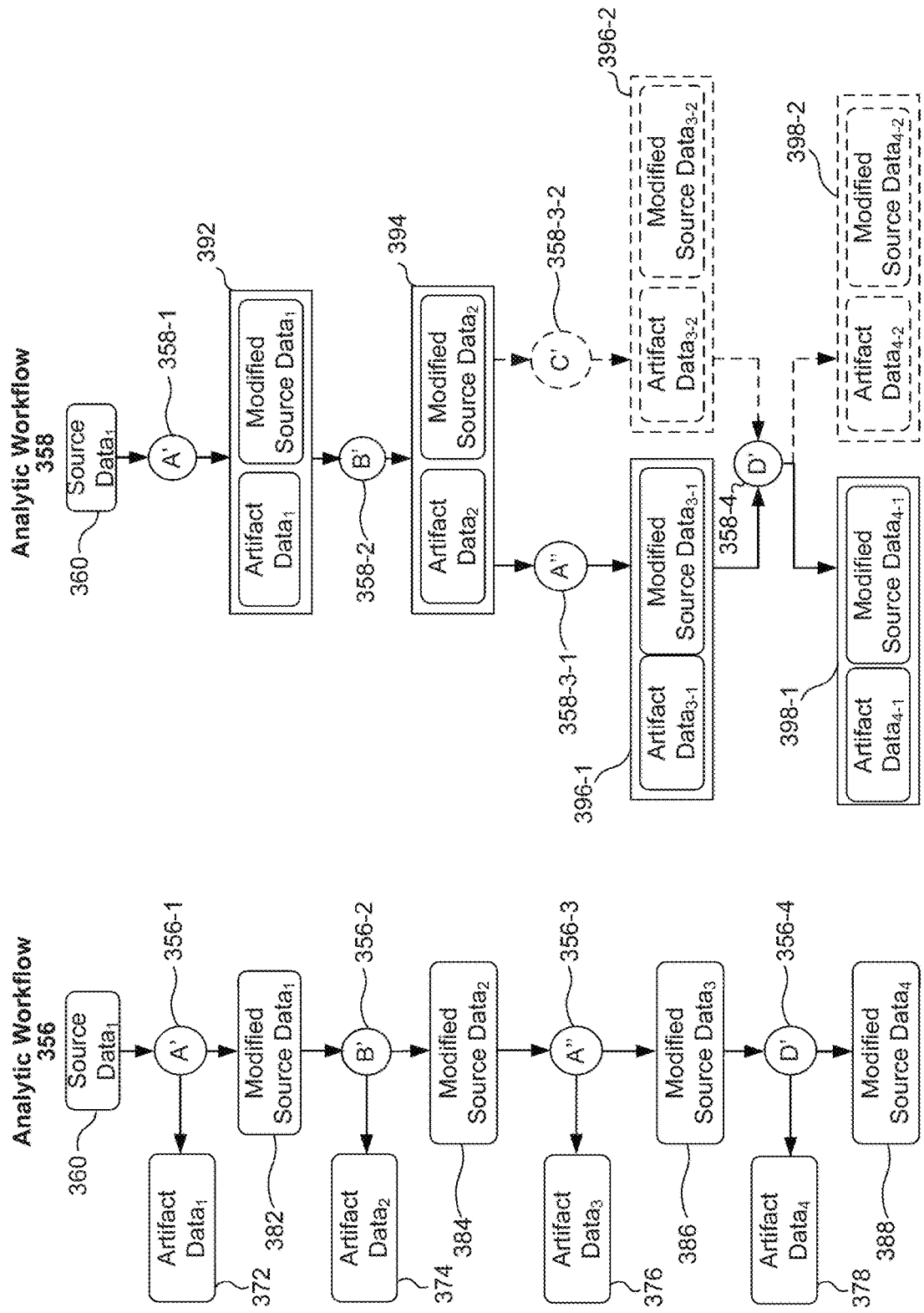

CROSS-CLOUD ORCHESTRATION OF DATA ANALYTICS FOR A PLURALITY OF RESEARCH DOMAINS

CROSS REFERENCE TO RELATED APPLICATIONS

This application is a continuation of U.S. Non-Provisional patent application Ser. No. 17/025,285, filed Sep. 18, 2020, which is a continuation of U.S. Non-Provisional patent application Ser. No. 16/454,887, filed Jun. 27, 2019, which is a continuation of U.S. Non-Provisional patent application Ser. No. 14/871,302, filed Sep. 30, 2015. This application is also related to U.S. Non-Provisional patent application Ser. No. 14/871,263 titled "CROSS-CLOUD ORCHESTRATION OF DATA ANALYTICS," filed on Sep. 30, 2015 with the same inventors as this application. All of the above referenced applications are herein incorporated by reference in their entireties.

BACKGROUND

Field

This disclosure is generally directed to cross-cloud orchestration of data analytics. More particularly, this disclosure relates to cross-cloud orchestration of data analytics for a plurality of research domains.

Background

The amount of information in numerous knowledge and research domains has increased and continues to increase at an exponential pace. While the vast amount of information, in its raw form, may contain a wealth of prominent knowledge, the extraction and storage of the knowledge from such amount of information for one or more knowledge or research domains have become a substantial challenge. Even after such salient knowledge has been extracted and stored, reliability of their derivation must be ensured before they may be confidently utilized.

SUMMARY

Provided herein are system, apparatus, article of manufacture, method and computer program product embodiments, and/or combinations and sub-combinations thereof, for cross-cloud orchestration of data analytics for a plurality of research domains.

An embodiment includes a computer implemented method for a cross-cloud orchestration of data analytics for a plurality of research domains. The method may operate by receiving one or more command and control (C&C) requests to execute one or more analytic applications of a workflow. The workflow includes the one or more analytic applications for execution. The method continues by generating one or more native access requests to execute the analytic applications at one or more analytics computing environments, and transmitting one or more native access requests to the one or more analytics computing environment, where at least two native access requests are configured for different access protocols.

Another embodiment includes a system for cross-cloud orchestration of data analytics for a plurality of research domains. The system may include at least one processor and a memory coupled to the at least one processor and may be configured to receive a command and control (C&C) request to execute a first analytic application of a workflow, the workflow may include analytic applications for execution. The at least one processor may be further configured to generate a first native access request to execute the first analytic application at a first analytics computing environment, and transmit the first native access request to the first analytics computing environment.

A further embodiment includes a tangible computer-readable device having instructions stored thereon that, when executed by at least one computing device, causes the at least one computing device to perform operations. The operations may include receiving a command and control (C&C) request to execute a first analytic application of a workflow, the workflow including analytic applications for execution. The operations may include generating a first native access request to execute the first analytic application at a first analytics computing environment, and transmitting the first native access request to the first analytics computing environment.

BRIEF DESCRIPTION OF THE FIGURES

The accompanying drawings are incorporated herein and form a part of the specification.

FIG. 2A illustrates a block diagram of knowledge application and knowledge datastore configured according to an example embodiment.

FIGS. 2B-2E illustrate block diagrams of an ontology datastore configured according to example embodiment(s).

FIGS. 3B-3E illustrate flow diagrams of analytic workflows according to example embodiments.

Figure 1:
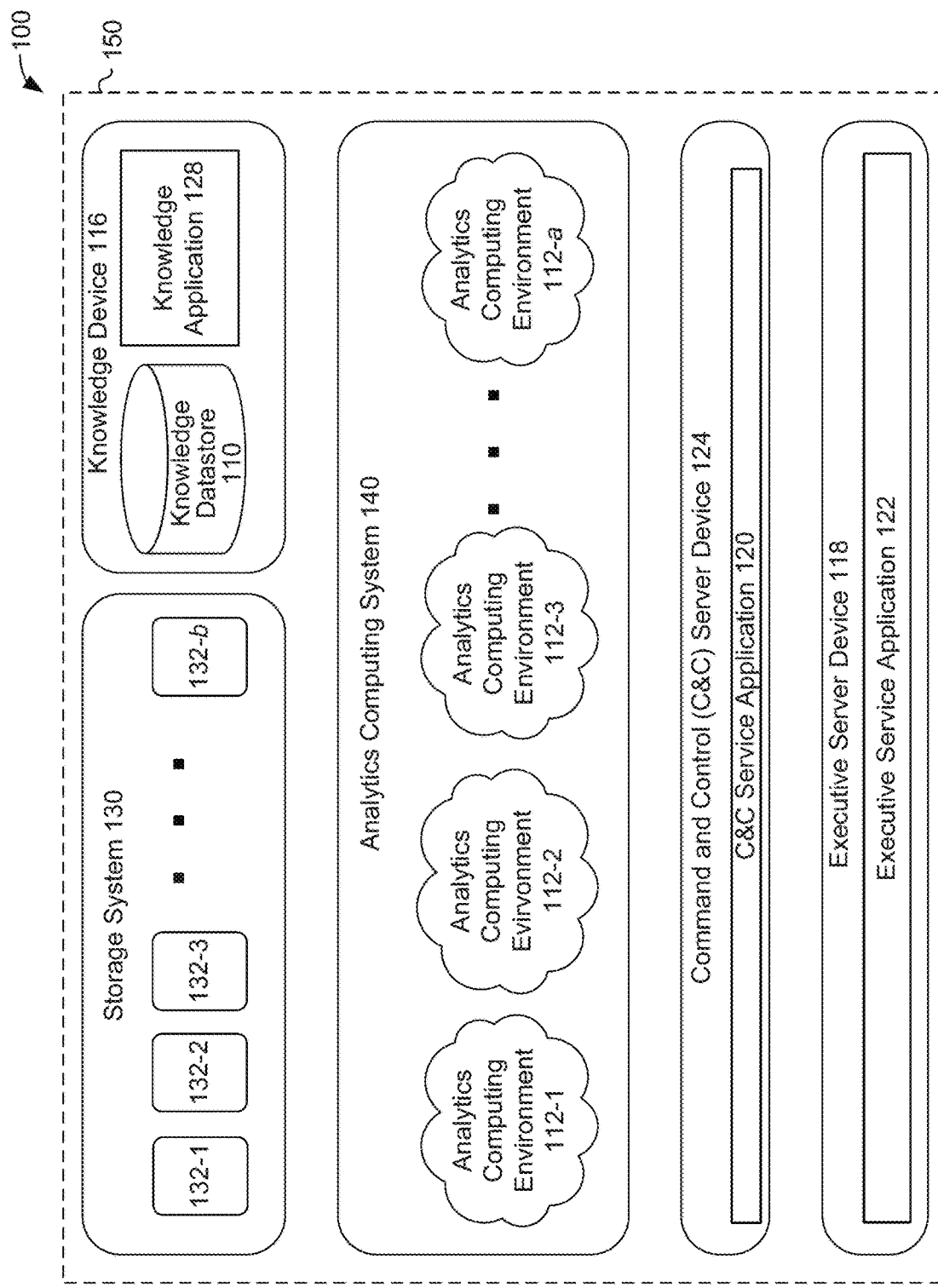
FIG. 1 illustrates a block diagram of cross cloud analytics system configured according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a complete set of elements 112-*a* may include elements 112-1, 112-2, 112-3, and 112-4.

DETAILED DESCRIPTION

There is an inherent challenge in creating a shared architecture that facilitates the development and execution of analytics on variegated information for multiple lines of computational research. This is especially true when each line of research can have a distinct expectation of how the generated results may be used. Various embodiments of the cross cloud analytics system 100 address these challenges by providing one or more software and hardware devices and/or components to support development and execution of analytics in a research and/or production setting. The cross cloud analytics system 100 also provides various embodiments that address these challenges which are applicable to different research scenarios with varied requirements and desired outcomes.

In various embodiments, the cross cloud analytics system 100 may also be utilized in support of challenges posed across broad efforts that seek to use data for decision making purposes. The effort is directed toward multiple, varied research domains, where each research domain addressed is a research thread comprised of related research projects. An analytic workflow for a given domain-focused research thread begins with data ingestion and preparation, which may be performed by a storage system and one or more analytics computing environments. By way of pattern recognition and analysis performed by one or more analytics computing environments, the relevant knowledge may be extracted from the ingested source data to create artifact data and/or further modified to create modified source data. The artifact data and/or modified source data may represent the results generated by one or more analytics computing environments. The results may then be visualized in a manner, such that a user (e.g., analyst, researcher, etc.) may receive the necessary indicators that can guide making optimal decisions and taking optimal actions. It may be appreciated that while the cross cloud analytics system 100 may address the challenges posed across efforts using data for decision making, cross cloud analytics system 100 may be applicable more widely as a general architectural model for any computational research stack, especially where multiple research threads may be expected to coexist.

FIG. 1 illustrates a block diagram of the cross cloud analytics system 100, according to an embodiment. The cross cloud analytics system 100 may include storage system 130, a knowledge device 116, analytics computing system 140, a command control server device 124, and an executive server device 118 which may all be interconnected via network interconnect fabric 150 which may include, without limitation, one or more wired and/or wireless network devices (e.g., load balancers, switches, routers, hubs, repeaters, etc.) across a variety of networks (e.g., internet, intranet, etc.).

In an embodiment, the storage system 130 may include, without limitation one or more storage server devices 132-$b$ operatively coupled to the analytics computing system 140. The one or more storage server devices (e.g., storage server device 132-1, 132-2, 132-3, etc.) may be interconnected between and among each other via one or more network devices (load balancers, switches, routers, hubs, repeaters, etc.) and configured to provide storage as a service (STaaS) with storage redundancy, failover, and/or high availability services.

In an embodiment, the one or more storage server devices (e.g., storage server devices 132-1, 132-2, 132-3, etc.) may be configured to receive source data, which may be streamed (i.e., streamed data), pushed (i.e., pushed data), and/or pulled (i.e., pulled data) from one or more source services or systems (not shown) via one or more network interfaces (not shown) as electrical and/or optical signals consistent with one or more wired and/or optical network standards (e.g., Ethernet, Fibre Channel, etc.).

In an embodiment, the one or more information source services or systems may include, without limitation, email services (e.g., Gmail, IBM Notes, etc.), social network services (e.g., Facebook, LinkedIn, etc.), chat systems (e.g., ICQ Chat, SMS, iChat, etc.), Blogs (e.g., Twitter, TUMBLR, etc.). Additionally, one or more source data acquisition services or systems (not shown) (e.g., HttpFS, Apache Flume, Apache Sqoop, etc.) operatively coupled to the storage system 130 may be utilized to receive the source data from source services or systems in bulk (e.g., fixed sized chunks, blocks, etc.) on a periodic basis, or steamed in real-time or near real-time from one or more source services or systems.

In an embodiment, the one or more storage server devices 132-$b$ may be further configured to store and/or ingest the received source data into a distributed file system (e.g., Hadoop Distributed File System (HDFS), etc.) implemented by the one or more storage server devices 132-$b$. To ensure the integrity of ingested source data for analysis by the one or more analytics computing system 140, in an embodiment, some or even all ingested source data may be configured to be immutable, so that no alteration or modification is possible to the ingested source data stored in the one or more storage server devices 132-$b$. It may be appreciated once the ingested source data is copied or cloned to another system, service, and/or device (e.g., the analytics computing system 140, etc.), the copied or cloned source data may be freely altered, modified, and/or mutated.

To further ensure integrity of ingested source data, in an embodiment, some or all of the one or more storage server devices 132-$b$ may also be configured to monitor and detect and/or correct source data corruption and/or ingestion failures (e.g., transfer errors, checksum errors, format errors, etc.). In an embodiment, some or all of the one or more storage server devices 132-$b$ may be configured to execute a validation application (not shown) to ensure validity of the ingested source data and conformance of the source data in one or more formats that is consistent with the one or more information source services or systems. The one or more storage server devices 132-$b$ may also be configured to generate ingest error information to notify analysts and researchers with respect to any errors and/or failures that may have been detected and/or corrected.

In an embodiment, the one or more storage server devices (e.g., storage server device 132-1, 132-2, 132-3, etc.) may also be configured to provide the ingested source data to the analytics computing system 140 via one or more network interfaces (not shown) as electrical and/or optical signals consistent with one or more wired and/or optical network standards. The provided ingested source data may then be stored in a local staging storage location associated with one or more analytic machines (e.g., physical machines and/or virtual machines further discussed with respect to FIG. 3A) for pattern recognition and/or analysis by analytic applications in the analytics computing system 140. Additionally, prior to the pattern recognition and/or analysis, the source data stored in the local staging storage location may be further profiled, filtered, and/or configured to a data model and/or format consistent with the data model and/or format utilized by the respective analytic machines (e.g., physical machines and/or virtual machines further discussed with respect to FIG. 3A) and analytic application.

In an embodiment, the analytics computing system 140 may include, without limitation, one or more analytics computing environments 112-$a$ operatively coupled to the storage system 130, knowledge device 116, and the command and control (C&C) server device 124. In an embodiment, the one or more analytics computing environments 112-$a$ may be implemented as a variety of cloud computing services such as, for example, software as a service (SaaS), platform as a service (PaaS), and/or infrastructure as a service (IaaS). Additionally or alternatively, one or more analytics computing environments 112-*a* may also be implemented as standalone server devices, where each standalone server device may be configured as a physical machine or virtual machine independent of any other analytic machines (e.g., physical machines and/or virtual machines further discussed with respect to FIG. 3A) that may be configured to perform a specific analytic purpose such as, for example, executing one or more analytic applications.

In an embodiment, the one or more analytics computing environments 112-*a* may be geographically separated (e.g., separate physical locations, etc.) and/or virtually separated (e.g., separate network domains, etc.) and may be provided by a variety of cloud computing providers (e.g., Microsoft Azure, Amazon Web Services, Google Compute Engine, etc.), each implementing a different access protocol. Example access protocols may include, without limitation, transfer protocols (e.g., hypertext transfer protocol (HTTP), HTTP secure (HTTPS), etc.), standard formats (e.g., JavaScript Object Notation (JSON), Extensible markup Language (XML), etc.), and/or Application Program Interfaces (APIs) (e.g., Microsoft Services Management APIs, Amazon Elastic Compute Cloud APIs, Google Cloud JSON APIs, etc.).

Regardless of their access protocols, network topology, and locations, the one or more analytics computing environments 112-*a* may be configured to execute the one or more analytic applications, in response to the one or more native access requests to execute an analytic application, where the one or more native access requests may include, without limitation, execution information. In an embodiment, the one or more analytic applications may include, without limitation, NetOwl, Statistical Analysis System (SAS), Serif, ArcGIS, SAP, and/or the like utilizing one or more APIs.

In an embodiment, the execution information may include, without limitation, execution identifier information (e.g., an alpha-numeric identifier or value, etc.) that identifies the instance of analytic application execution, execution application information identifying the analytic application to be executed, execution host information identifying the host to execute the application, execution parameters information identifying the parameters for the analytic application to be executed, execution input information identifying the data that is input into the analytic application for pattern recognition and/or analysis, and/or execution output information identifying the data that is output by the analytic application after or during execution.

In an embodiment, C&C server device 124 may include, without limitation, a C&C service application 120 operatively coupled to the analytics computing system 140 and an executive server device 118. The C&C service application 120 may be configured to receive a C&C request to execute an analytic workflow from the executive server device 118, where the analytic workflow may include one or more analytic applications for execution in one or more sequences further discussed with respect to FIGS. 3B-3E.

In an embodiment, the executive server device 118 may include, without limitation, executive service application 122 configured to communicate with C&C server device 124, storage system 130, and/or knowledge device 116. Optionally, the executive server device 118 may also be configured to communicate with the analytics computing system 140. The executive service application 122 may be further configured to interpret and/or execute one or more analytic workflows.

In an embodiment, the knowledge device 116 may include, without limitation, a knowledge application 128. The knowledge application 128 may be configured to communicate with the analytics computing system 140, the C&C server device 124, the executive server device 118, and/or the knowledge datastore 110 to provide and store analytics data and/or provenance data generated and/or determined by the analytics computing system 140 in the knowledge datastore 110. Additionally or alternatively, the knowledge application 128 may be further configured to determine additional inferences based on the analytics data stored within the knowledge datastore 110. The analytics data may include, without limitation, artifact data and/or modified source data that may be generated by the execution of one or more analytic applications in the analytics computing system 140.

FIG. 2A illustrates a block diagram of the knowledge application 128 and the knowledge datastore 110 according to an example embodiment. The knowledge application 128 may further include, without limitation, analytics component 228 and adapter component 224.

Figure 5:
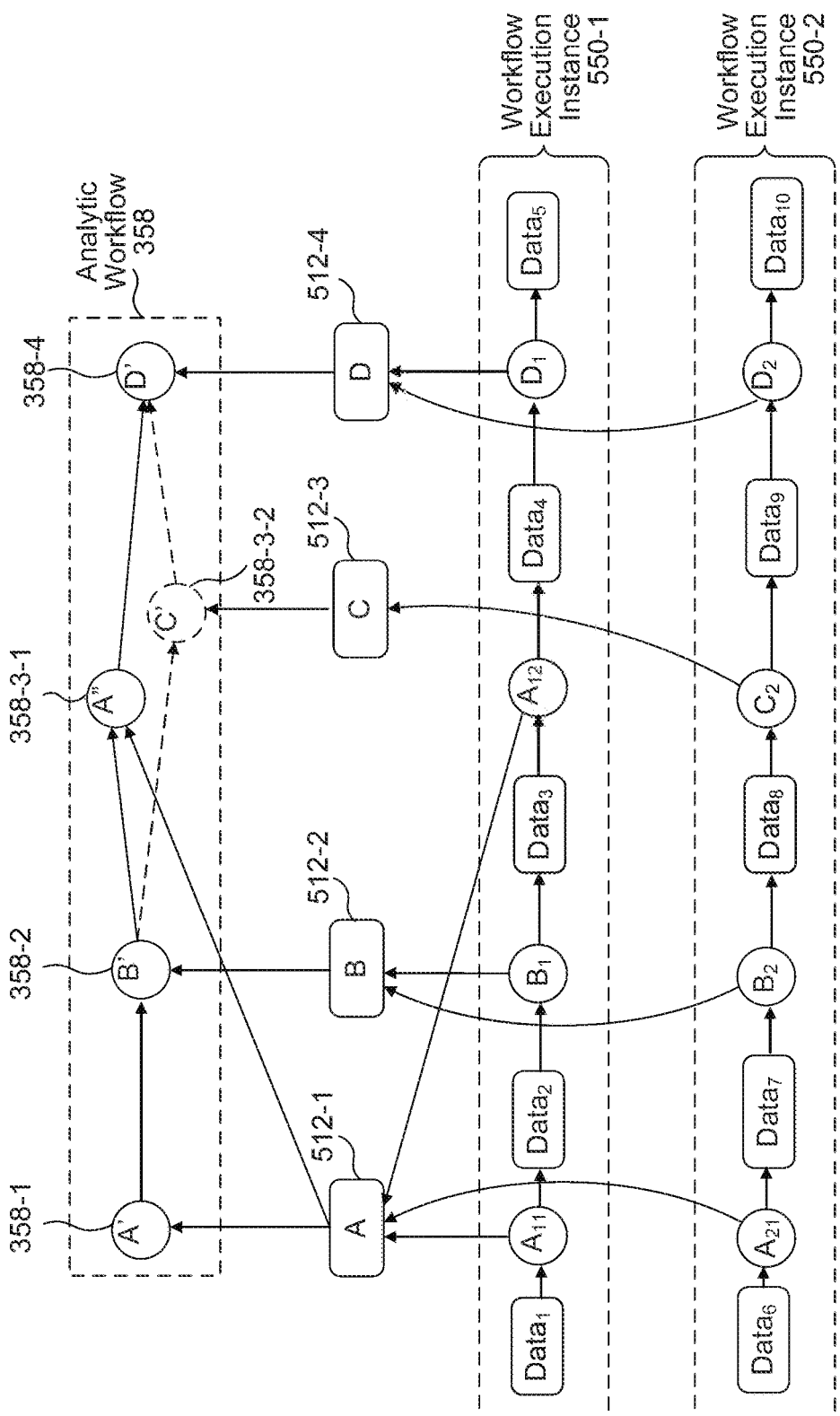
FIG. 5 illustrates a block diagram of provenance class information according to an example embodiment.

In an embodiment, the knowledge store 110 may be configured to store analytics data which may represent the results generated by the one or more computing environments of the analytics computing system 140 and provenance data further discussed with respect to FIG. 5. The knowledge store 110 may include, without limitation, a document datastore 212 for storing, organizing, and/or retrieving documents or semi-structured data, a key-value datastore 214 for storing and retrieving data objects (i.e., value) identified by a unique identifier (i.e., key), an object datastore 216 storing scalable amounts of unstructured data, a graph datastore 218 for storing graphs comprising of nodes interconnected with edges and decorated with properties, ontology datastore 220 (further discussed with respect to FIGS. 2B-2E), and provenance datastore 222 (further discussed with respect to FIG. 5). In an embodiment, the knowledge datastore 110 may implement one or more data models represented as one or more ontologies (i.e., an ontology data model further discussed with respect to FIGS. 2B-E).

In an embodiment, the adapter component 224 may be configured to communicate with one or more analytics computing environments 112-*a* of the analytics computing system 140, the C&C server device 124, and/or the executive server device 118. In an embodiment, the adapter component 224 may be configured to receive analytics data (e.g., artifact data, modified source data, etc.) and/or provenance data from the one or more analytics computing environments 112-*a* and store the received analytics data in the document datastore 212, key-value datastore 214, an object datastore 216, and/or a graph datastore 218. Additionally, the adapter component 224 may be further configured to map the received analytics data to a common schema consistent with the ontology data model of the ontology datastore 220 and/or store the received provenance data in the provenance datastore 222.

In an embodiment, the adapter component 224 may also be configured to provide the previously received, stored, and/or mapped analytics data to the one or more analytics applications executing in the analytics computing environments 112-*a* of the analytics computing system 140. Additionally, the adapter component 224 may also be configured to map the ontology data model to a data model of the one or more analytics applications (i.e., analytics application data model).

In an embodiment, the analytics component 228 may be configured to post process the received, stored, and/or mapped analytics data in the knowledge datastore 110. To post process the received, stored, and/or mapped analytics data, the analytics component 228 may include an indexing component (not shown) configured to create one or more indices of the received, stored, and/or mapped analytics data stored in the document datastore 212 and/or provenance data stored in the provenance datastore 222. The analytics component 228 may also include an inferences component (not shown) configured to generate additional inferences based on ontology data model stored in the ontology datastore 220. Additionally or alternatively, the analytics component 228 may be further include a service oriented architecture (SOA) component (not shown) configured to provide web based SOA portals to enable an analyst and/or researcher to access the stored and/or mapped analytics data and/or stored provenance data within the knowledge datastore 110. Additionally or alternatively, the analytics component 228 may further include a Structured Query Language (SQL) component (not shown) configured to provide database access to the analytics data and/or provenance data utilizing one or more application program interfaces (API) (e.g., MySQL API, etc.)

It may be appreciated that once the analytics data and/or provenance data has been mapped, stored, and/or post processed in the knowledge datastore 110, analysts and/or researchers may utilize one or more visualization components (not shown) and decision components (not shown) operatively coupled to the knowledge datastore 110 to access the knowledge datastore 110, for the received, stored, mapped, and/or processed analytics data and/or provenance data, and visually present the received, stored, mapped, and/or processed analytics data on a display device (not shown) operatively coupled to the knowledge datastore 110 via the visualization components (not shown) and decision components (not shown). This may further enable the analysts and/or researchers to document and make an informed decision based on the analytics data and/or provenance data.

To ensure integrity of analytics data and/or provenance data, in an embodiment, the knowledge application 128 may further include a validation component (not shown). In an embodiment, the validation component may be configured to validate mapped, stored, and/or post processed analytics data and/or provenance data to ensure conformance of the analytics data and/or provenance data to one or more data models of the one or more datastores. The validation component (not shown) may also be configured to generate datastore error information to notify analysts and researchers with respect to any errors and/or failures that may have been detected and/or corrected during validation.

FIGS. 2B-2E illustrate block diagrams of an ontology datastore 220 configured according to an example embodiment. As illustrated in FIGS. 2B-2E, the ontology datastore 220 may be generally configured for storing a formal taxonomy of types, relationships, rules, and existing entities represented as ontological elements that may define a knowledge domain. The ontology datastore 220 may include one or more ontology data models, which may be represented as one or more ontologies (e.g., upper ontologies 230, lower ontologies 232, cross research domain ontologies 234, etc.).

In an embodiment, the one or more ontologies may provide a collection of terms and assertions represented as one or more ontological elements and their associated properties, relationships, and/or rules between and among the one or more other ontological elements. Each ontology data model may include one or more ontological elements, where the one or more ontological elements may provide a meaning or definition for a term, an assertion, a person, a location, a region, a concept, an event, an organization, and/or the like, and may include one or more properties that may be associated with the respective ontological element (e.g., name property being associated with the person entity, the location entity, the region entity, etc.). Similarly, the one or more ontological elements may also be associated with one or more ontologies, where the one or more ontologies may be created or implemented for a specific knowledge domain or research domain (e.g., science, finance, history, banking, law, etc.).

In an embodiment, the upper ontology data models 230 may be implemented using a pre-existing upper ontology such as, for example, Suggested Upper Merged Ontology (SUMO) or OpenCyc, or may be a custom ontology specifically created for a particular set of research domains that may be common across the particular set of research domains. In an embodiment, the lower ontology data models 232 may include one or more entities mapped by the adapter component 224 based on the analytics and pattern recognition performed by the one or more analytics computing environments 112-a.

To create one or more comprehensive ontology data models that span across a variety of research domains, lower ontology data model 232 (e.g., lower ontology data models 232-1, 232-2, 232-3) created or configured for a specific research domain or determined by the one or more analytics, may be configured to inherit from the one or more of the upper ontology data models 230 (e.g., upper ontology data model 230-1 and upper ontology data model 230-2) as illustrated in FIG. 2B. This may enable the knowledge or research domain specific ontological elements and their associated properties to supplement an upper ontology that otherwise may not be present within that upper ontology (e.g., upper ontology 230-1, and/or upper ontology 230-2). It may be appreciated that by inheriting from one or more upper ontologies 230, the problems associated with creating a single ontology to accommodate a wide variety of knowledge or research domains and interrelated research projects may be circumvented, while the capability to systematically create and combine ontologies may be enhanced, so that ontological elements can be used and reused in new combinations as required.

To create a new ontology data model from existing ontology data models, lower ontologies that may be contextually related such as, for example, lower ontology 232-1 (e.g., context of computer engineering, etc.) and lower ontology 232-2 (e.g., context of electrical engineering, etc.) may be configured to inherit from the same upper ontology data model 230-1 as illustrated in FIG. 2C to form a cross domain ontology data model 234-1. It may be appreciated that the upper ontology data models 230 may be implemented using a pre-existing upper ontology as previously discussed, or may be a custom ontology specifically created for a particular set of research domains that may be common across the particular set of research domains also previously discussed.

Figure 2D:
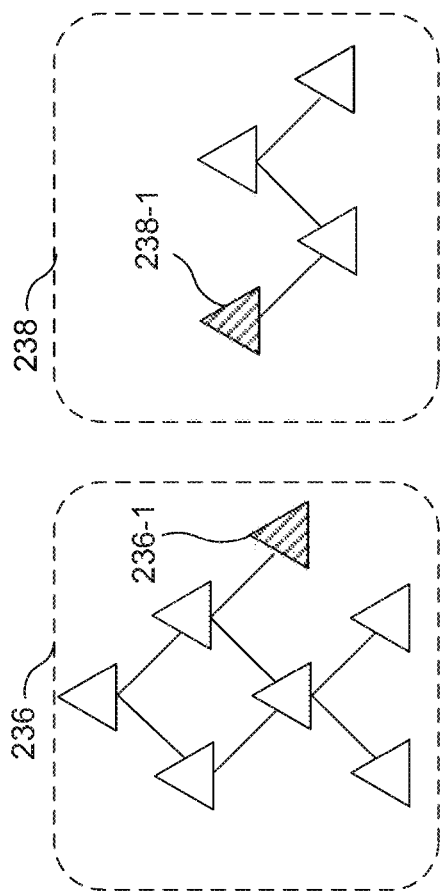
Figure 2E:
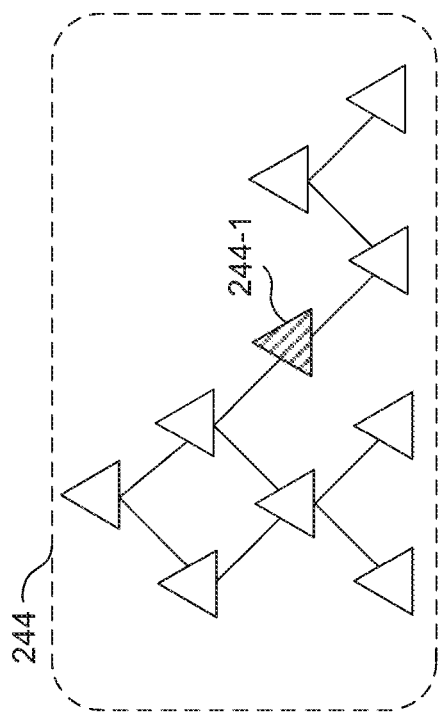

When collisions of ontological elements (e.g., terms, assertions, etc.) occur between different research domain specific ontologies, i.e., the same ontological element (e.g., term, assertion, etc.) occurs in two different ontologies, such as, for example, ontological elements 236-1 and 238-1 as illustrated in FIG. 2D, the two different ontological elements 236-1 and 238-1 of the ontologies 236 and 238, respectively, may be merged. In such embodiments, the merged ontological element 244-1 as illustrated in FIG. 2E may inherit from both ontologies 236 and 238, and may include properties from both ontologies 236 and 238, which may create or form a merged ontology data model 244 that includes the merged ontological element 244-1. It may be appreciated that the merged ontological element 244-1 may now be applicable in either knowledge or research domains associated with ontologies 236 and 238.

Figure 3A:
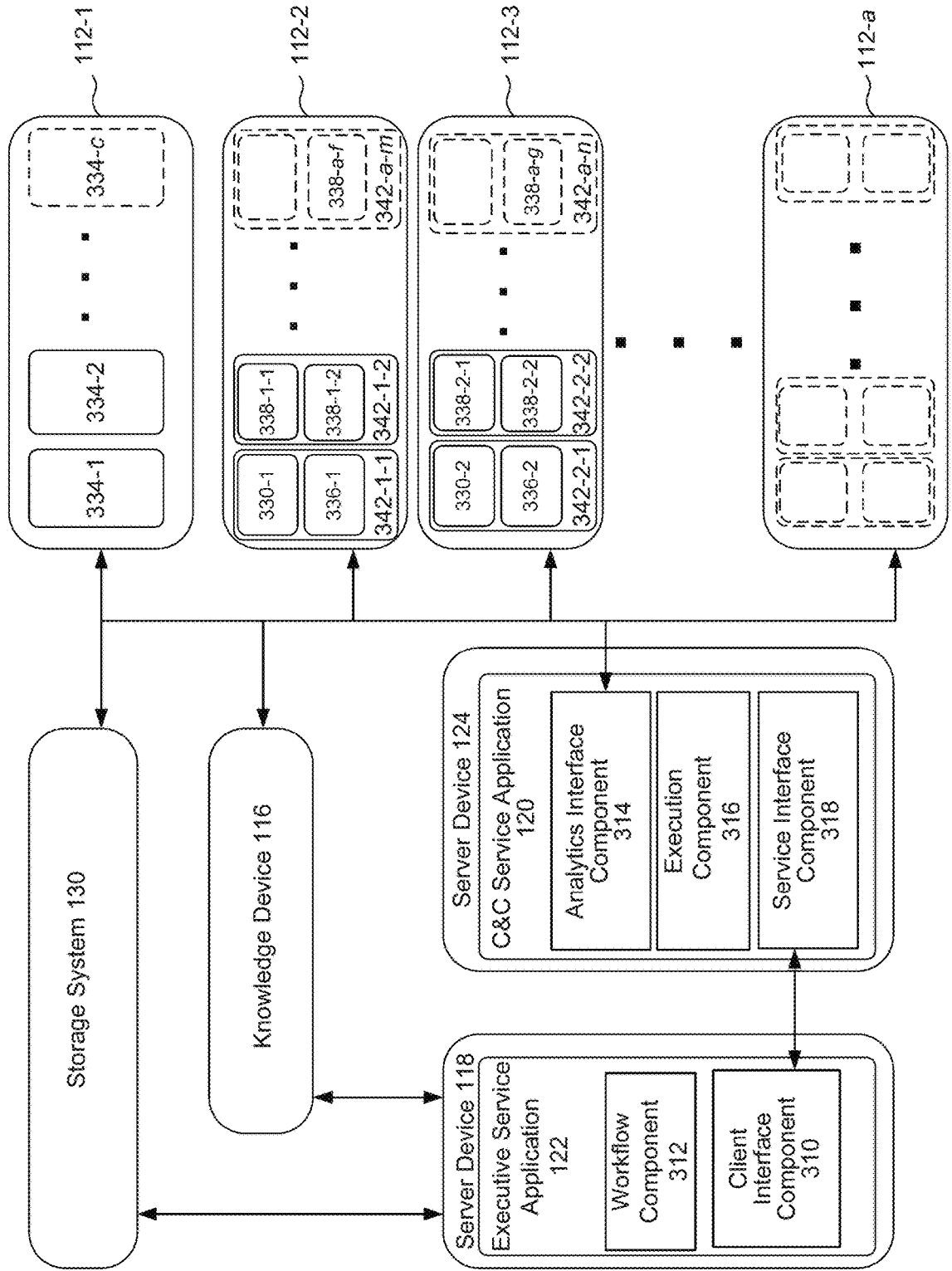
FIG. 3A illustrates a detailed block diagram of a C&C server application, an executive service application, and analytics computing system according to an example embodiment.

FIG. 3A illustrates a detailed block diagram of a C&C server application, an executive service application, and analytics computing system according to an example embodiment.

In an embodiment, the executive service application 122 may further include a workflow component 312 and a C&C client interface component 310. The workflow component 312 may be configured to interpret and/or execute one or more analytic workflows. For example, the one or more analytic workflows may be implemented using business process execution language (BPEL), where the workflow component 312 may be configured to dynamically compile and link, interpret, and/or execute the one or more analytic workflows implemented in BPEL and communicate with the C&C service application 120 to perform the one or more analytic workflows. Additionally or alternatively, the one or more analytic workflows implemented in BPEL may be compiled, linked, and executed by the workflow component 312 to perform the one or more analytic workflows.

In an embodiment, the executive service application 122 may be configured to communicate with the C&C service application 120 via the C&C client interface component 310 and C&C service interface component 318. In an embodiment, the C&C client interface component 310 may be configured to provide one or more C&C requests to the C&C service application 120 and receive one or more C&C responses from the C&C service application 120 based on the one or more analytic workflows interpreted and/or executed by the workflow component 312.

In an example implementation, the C&C client interface component 310 may be configured to communicate one or more messages and associated properties with the C&C service interface component 318 utilizing a C&C protocol. The C&C protocol may include, without limitation, a protocol implemented using a representational state transfer (REST) architecture and may provide a REST API configured to receive C&C requests and provide C&C responses. Additionally, the C&C protocol may be implemented as a separate and distinct protocol in comparison to one or more native access protocols utilized between the analytics computing environments 112-*a* and the C&C service application 120.

In an embodiment, the C&C service application 120 may include, without limitation, an analytics interface component 314, an execution component 316, and a service interface component 318. The service interface component 318 may be configured to receive one or more C&C requests from the executive service application 122 and provide one or more C&C responses to the executive service application 122 utilizing the C&C protocol.

In an embodiment, the analytics interface component 314 may be configured to communicate with one or more analytics computing environments 112-*a* utilizing a native access protocol that is specific or native to each of the one or more analytics computing environments 112-*a*. Thus, the analytics interface component 314 may be configured to transmit one or more native access requests to the one or more analytics computing environments 112-*a* and receive one or more native access responses from the one or more analytics computing environments 112-*a*.

In an embodiment, the execution component 316 may be generally configured to manage the execution of one or more analytic applications in one or more analytics computing environments 112-*a*. In an embodiment, the execution component 316 may be configured to translate or convert at least some of the C&C requests received from executive service application 122 into one or more corresponding native access requests for one or more specific analytics computing environments (e.g., analytics computing environment 112-1, 112-1, 112-3, etc.) based at least partially on the execution information (e.g., execution application information identifying the analytic application to be executed, execution host information identifying the analytic computing environment to execute analytic application) in a corresponding C&C request. Additionally or alternatively, the execution component 316 may also be configured to translate at least some of the native access responses received from a specific analytics computing environment (e.g., analytics computing environment 112-1, 112-1, 112-3, etc.) to one or more corresponding C&C responses for transmission to the executive service application 122.

In an embodiment, the one or more analytics computing environments 112-*a* may include one or more devices, which may be implemented as virtual and/or physical machines. In an embodiment, at least one of the analytics computing environments 112-*a* may further include a cloud gateway server device (e.g., cloud gateway server device 338-1, 338-2, etc.) and one or more provisioning server devices. In an embodiment, the analytics computing environments may be further configured to provide one or more cloud computing services as previously discussed. In an embodiment, some or all of the computing analytics environments 112-*a* may also be configured to communicate with the C&C service application 120 via a native access protocol that is specific to a computing analytics environment.

For example, computing analytics environment 112-1 may include, without limitation, one or more standalone server devices 334-*c* each configured to execute one or more analytic applications. The standalone server devices 334-*c* may also be configured to implement a first native access protocol. The standalone server devices 334-*c* may be further configured to receive native access requests and provide native access responses via the first native access protocol.

Continuing with the above example and with respect to analytics computing environment 112-2, the analytics computing environment 112-2 may be configured to provide cloud computing services, where the cloud computing services may be shared with zero or more tenants. The analytics computing environment 112-2 may include one or more virtual machines 338-*a*-*f* configured to execute one or more analytic applications. Additionally, each of the virtual machines 338-*a*-*f* may also be provisioned and/or configured to execute on one or more physical server devices 342-*a*-*m*.

Continuing with the above example, the analytics computing environment 112-2 may further include, without limitation, at least one provisioning server device which may be implemented as a virtual machine 330-1, i.e., a virtual provisioning server device 330-1. The virtual provisioning server device 330-1 may be configured to dynamically provision the one or more virtual machines 338-*a*-*f* to one or more physical server devices 342-*a*-*m* based at least partially on the availability of computing resources (e.g., memory resources, processing resources, etc.) of the one or more physical server devices 342-*a*-*m*.

Continuing with the above example, the analytics computing environments 112-2 may further include at least one cloud gateway server device, which may also be implemented as a virtual machine, i.e., a virtual gateway server device 336-1. The virtual gateway server device 336-1 may be configured to implement a second native access protocol that is different than the first native access protocol. The virtual gateway server device 336-1 may be further configured to receive native access requests from the C&C service application 120 and direct the received native access requests to a virtual machine (e.g., virtual machine 338-1-1, 338-1-2, etc.) configured to execute a requested analytic application. The virtual gateway server device 336-1 may be also be configured to provide native access responses to the C&C service application 120, which may be received from the virtual machine, in response to the received native access requests.

Continuing with the above example and with respect to analytics computing environment 112-3, the analytics computing environment 112-3 may be similarly configured with respect to the analytics computing environment 112-2. Thus, the analytics computing environment 112-3 may be configured to provide cloud computing services, where the cloud computing services may be shared with zero or more tenants. The analytics computing environment 112-3 may include one or more virtual machines 338-$a$-$g$ configured to execute one or more analytic applications. Additionally, each of the virtual machines 338-$a$-$g$ may also be provisioned and/or configured to execute on one or more physical server devices 342-$a$-$n$.

Continuing with the above example, the analytics computing environment 112-3 may further include, without limitation, at least one provisioning server device which may be implemented as a virtual machine, i.e., a virtual provisioning server device 330-2. The virtual provisioning server device 330-2 may be configured to dynamically provision the one or more virtual machines 338-$a$-$g$ to the one or more physical server devices 342-$a$-$n$ based at least partially on the availability of computing resources (e.g., memory resources, processing resources, etc.) of the one or more physical server devices 342-$a$-$n$.

Continuing with the above example, the analytics computing environments 112-3 may further include at least one cloud gateway server device, which may also be implemented as a virtual machine, i.e., a virtual gateway server device 336-2. The virtual gateway server device 336-2 may be configured to implement a third native access protocol that is different than the first and second native access protocols. The virtual gateway server device 336-2 may be further configured to receive native access requests from the C&C service application 120 and direct the received native access requests to a virtual machine (e.g., virtual machine 338-2-1, 338-2-2, etc.) configured to execute a requested analytic application. The virtual gateway server device 336-2 may be also be configured to provide native access responses to the C&C service application 120, which may be received from the virtual machine, in response to the received native access requests.

In an embodiment, each of the one or more of the analytics computing environments 112-1, 112-2, and 112-3 may be geographically separated between and among each other and may also be logically separated between and among each other (i.e., in different network domains between and among each other).

FIGS. 3B-3E illustrate detailed flow diagrams of analytic workflows according to example embodiments. The analytic workflows may identify one or more analytic applications to be executed (i.e., execution application information) and one or more hosts (e.g., one or more analytic machines, such as, standalone server devices and/or virtual machines) to execute the one or more analytic applications (i.e., execution host information). The analytic workflows may also identify the execution inputs (i.e., execution input information) and execution outputs (i.e., execution output information) of each analytic application to be executed in the analytic workflow and associated execution parameters (i.e., execution parameters information).

Thus, as previously discussed, each application execution within an analytic workflow may be associated with execution information, which may include, without limitation, the execution application information identifying the analytic application to be executed, the execution host information identifying the host to execute the analytic application, the execution parameters information identifying the parameters for the analytic application to be executed, the execution input information identifying the data that is input into the analytic application to be executed, and/or execution output information identifying the data that is output by the analytic application after or during execution.

In an embodiment, some or all of the steps executed in the analytic workflows illustrated in FIGS. 3B-3E may be executed in particular sequence(s) based on their specific execution input (i.e., source data, modified source data, and/or artifact data) and/or execution output (i.e., modified source data and/or artifact data) dependences. In an embodiment, some or all of the analytic applications may be not re-executed, when an analytic application's execution inputs may not have been modified from a previous execution of that analytic application.

In an embodiment, some or all of the execution outputs such as, for example, artifact data and/or modified source data may be representative of the final results that may be persisted in the knowledge datastore 110 for further post processing by the analytics component 228. Additionally or alternatively, some of the some or all of the execution outputs may be representative of the temporary data that may not be persisted in the knowledge datastore 110 for further post processing by the analytics component 228 but may only be temporarily stored for further pattern recognition and/or analysis by another analytic application.

It may be appreciated that some or all the analytic applications (e.g., analytic applications A, B, C, and D) illustrated in FIGS. 3B-3E may be executed or repeatedly executed. To indicate an instance of execution of an analytic application for an analytic workflow, some analytic applications may be labeled in FIGS. 3B-3E with a single quote (i.e., analytic application A' in step 354-1). To indicate any repeated instances of execution of the same analytic application for an analytic workflow, which may occur sequentially or simultaneously with the same analytic application or a different analytic application, some analytic applications in FIGS. 3B-3E may be labeled with two or more single quotes (i.e., analytic application A" in step 354-3).

FIG. 3B illustrates an example embodiment of an analytic workflow 352. In the analytic workflow 352, the analytic workflow may start at step 352-1, and the analytic application A may be requested for execution to perform analysis (e.g., pattern recognition, etc.) on source data$_1$ 360 as the execution input stored in storage systems 130, and to generate artifact data$_1$ 372 as the execution output. At step 352-2, the analytic application B may also be requested for execution and perform analysis on input source data$_1$ 360 as the execution input stored in storage systems 130, and generate artifact data$_2$ 374 as execution output. At step 352-3, the analytic application A may again be requested for execution and perform analysis on input source data$_2$ 362 as execution input stored in storage systems 130, and generate artifact data$_3$ 376 as execution output.

In an embodiment, the artifact data$_1$ 372, artifact data$_2$ 374, artifact data$_3$ 376 may be representative of extracted or summarized result data based on the analysis performed by the analytic applications A and B. Furthermore, because any of the steps 352-1, 325-2, and 352-3 may have no dependencies between and among each other with respect to execution inputs and outputs, steps 352-1, 325-2, and 352-3 may be requested for execution in any order or substantially simultaneous or contemporaneous with respect to each other.

At step 352-4, the analytic application D may be requested for execution to perform analysis on the artifact data$_1$ 372, artifact data$_2$ 374, artifact data$_3$ 376 as the execution inputs and generate artifact data$_4$ 378 as the execution outputs. Additionally, because the execution inputs of analytic application D are dependent upon execution outputs of the analytic applications A and B, the execution of analytic application D may only occur after all the artifact data$_1$ 372, artifact data$_2$ 374, artifact data$_3$ 376 have been generated. Furthermore, if one or more analytic applications A and/or B are not executed on the same host (e.g., standalone server device or virtual machine) as analytic application D, then generated intermediate data (e.g., artifact data$_1$ 372, artifact data$_2$ 374, artifact data$_3$ 376) may be first transferred to the knowledge datastore 110 and then transferred back to the host executing analytic application D.

It may be appreciated that the analytic workflow 352 may be representative of an aggregation analytic workflow where artifact data (e.g., artifact data$_1$ 372, artifact data$_2$ 374, artifact data$_3$ 376) generated by the execution of one or more analytic applications may be aggregated together and merged into a new result (e.g., artifact data$_4$ 378), which may be persisted on the knowledge datastore 110 for post processing by the analytics component 228.

FIG. 3C illustrates an example embodiment of an analytic workflow 354. In the analytic workflow 354, the analytic workflow may start at step 354-1 and the analytic application A may be requested for execution and perform analysis and modifications on source data$_1$ 360 as the execution input stored in storage systems 130, and generate modified source data$_1$ 382 as the execution output. It may be appreciated that because source data$_1$ 360 may be immutable, a copy or a clone of the immutable source data$_1$ 360 may instead be modified by the analytic application A.

At step 354-2, the analytic application B may be requested for execution and perform analysis on and modifications to the modified source data$_1$ 382 as the execution input and generate modified source data$_2$ 384 as the execution output. Additionally, if application A and B are not executed on the same host (e.g., same standalone server device or virtual machine), then generated modified source data$_1$ 382 may be first transferred to the knowledge datastore 110 from the host executing analytic application A and then transferred from the knowledge datastore 110 to the host executing analytic application B.

At step 354-3, the analytic application A may be requested for execution again and perform analysis on and further modifications to the modified source data$_2$ 384 as the execution input, and generate modified source data$_3$ 386 as the execution output. Additionally, if the second execution of application A and previous execution of application B are not executed on the same host, then generated modified source data$_2$ 384 may be first transferred to the knowledge datastore 110 from the host executing application B and then transferred from the knowledge datastore 110 to the host executing analytic application A.

At step 354-4, the analytic application D may be requested for execution and perform analysis on and further modifications to the modified source data$_3$ 386 as the execution input and generate modified source data$_4$ 388 as the execution output. Additionally, if the execution of application D and previous second execution of application A are not executed on the same host, then generated modified source data$_3$ 386 may be first transferred to the knowledge datastore 110 from the host executing application A and then transferred from the knowledge datastore 110 to the host executing analytic application D.

It may be appreciated that the analytic workflow 354 may be representative of an alteration analytic workflow where the immutable source data$_1$ 360 may be first copied or cloned and then subsequently modified or mutated (e.g., modified source data$_1$ 382, modified source data$_2$ 384, modified source data$_3$ 386, modified source data$_4$ 388, etc.) by the execution of one or more analytic applications to generate modified source data$_4$ 388. Furthermore, some or all of the modified source data may be persisted on the knowledge datastore 110 for post processing by the analytics component 228.

FIG. 3D illustrates an example embodiment of an analytic workflow 356. In the analytic workflow 356, the analytic work flow may start at step 356-1 and the analytic application A may be requested for execution and perform analysis and modifications on source data$_1$ 360 as the execution input stored in storage systems 130 and generate modified source data$_1$ 382 and artifact data$_2$ 372 as the execution outputs. It may be appreciated that because source data$_1$ 360 may be immutable, a copy or a clone of the immutable source data$_1$ 360 may instead be modified by the analytic application A to produce the modified source data$_1$ 382.

At step 356-2, the analytic application B may be requested for execution and perform analysis on and modifications to the modified source data$_1$ 382 as the execution input and generate modified source data$_2$ 384 and artifact data$_2$ 374 as the execution outputs. Additionally, if analytic applications A and B are not executed on the same host (e.g., standalone server device or virtual machine), then generated modified source data$_1$ 382 may be first transferred to the knowledge datastore 110 from the host executing application A and then transferred from the knowledge datastore 110 to the host executing analytic application B.

At step 356-3, the analytic application A may be requested for execution again and perform analysis on and further modifications to the modified source data$_2$ 384 as the execution input and generate modified source data$_3$ 386 and artifact data$_3$ 376 as the execution outputs. Additionally, if the second execution of application A and previous execution of application B are not executed on the same host, then generated modified source data$_2$ 384 may be first transferred to the knowledge datastore 110 from the host executing application B and then transferred from the knowledge datastore 110 to the host executing analytic application A.

At step 356-4, the analytic application D may be requested for execution and perform analysis on and further modifications to the modified source data$_3$ 386 as the execution input and generate modified source data$_4$ 388 and artifact data$_4$ 378 as the execution outputs. Additionally, if the execution of application D and previous second execution of application A are not executed on the same host, then generated modified source data$_3$ 386 may be first transferred to the knowledge datastore 110 from the host executing application A and then transferred from the knowledge datastore 110 to the host executing analytic application D.

It may be appreciated that the analytic workflow 356 may be representative of a pipeline analytic workflow where the immutable source data 360 may be first copied or cloned into a local memory associated with the host executing analytic application A and then subsequently modified or mutated by the execution of one or more analytic applications (e.g., analytic applications B, A, and D) to generate modified source data$_4$ 388. Additionally, at one or more steps, artifact data (e.g., artifact data$_1$ 372, artifact data$_2$ 374, artifact data$_3$ 376, and artifact data$_4$ 378) may be generated to summarize the source data (e.g., immutable source data$_1$ 360) and one or more modified source data (e.g., modified source data$_1$ 382, modified source data$_2$ 384, modified source data$_3$ 386). Furthermore, some or all of the generated artifact data and/or modified source data may be persisted on the knowledge datastore 110 for post processing by the analytics component 228.

FIG. 3E illustrates an example embodiment of an analytic workflow 358, which may include a combination of one or more steps of FIGS. 3B-D, and may further include an alternative execution path. In the analytic workflow 358, the analytic work flow may start at step 358-1 and the analytic application A may be requested for execution and perform analysis and/or modifications on source data$_1$ 360 as the execution input stored in storage systems 130 and generate modified source data$_1$ and/or artifact data$_1$ (i.e., execution results data 392 as the execution outputs). It may be appreciated that because source data$_1$ 360 may be immutable, a copy or a clone of the immutable source data$_1$ 360 may instead be modified by the analytic application A to produce the execution results data 392.

At step 358-2, the analytic application B may be requested for execution and perform analysis on the execution results data 392 which may include modified source data$_1$ and/or artifact data as the execution input and generate execution results data 394 as the execution outputs, which may include modified source data$_2$ and/or artifact data$_2$. Additionally, if analytic applications A and B are not executed on the same host (e.g., standalone server device or virtual machine), then execution results data 392 may be first transferred to the knowledge datastore 110 from the host executing application A and then transferred from the knowledge datastore 110 to the host executing analytic application B.

After step 358-2, the analytic workflow 358 may branch into a first analytic workflow execution path starting at step 358-3-1 and a second analytic workflow execution path starting at step 358-3-2.

With respect to the first analytic workflow execution path, at step 358-3-1, the analytic application A may be requested for execution again and perform analysis on and/or further modifications to execution results data 394 as the execution input, which may include modified source data$_2$ and/or artifact data$_2$. The analytic application A may further generate execution results data 396-1 which may include modified source data$_{3-1}$ and artifact data$_{3-1}$ as the execution outputs. Additionally, if the second execution of application A and previous execution of application B are not executed on the same host, then generated execution results data 394 may be first transferred to the knowledge datastore 110 from the host that executed application B at step 358-2 and then transferred from the knowledge datastore 110 to the host executing analytic application A at 358-3-1.

With respect to the first analytic workflow execution path, at step 358-4, the analytic application D may be requested for execution and perform analysis on and/or further modifications to execution results data 396-1 as the execution input, which may include modified source data$_{3-1}$ and/or artifact data$_{3-1}$. The analytic application D may further generate execution results data 398-1 which may include modified source data$_{4-1}$ and/or artifact data$_{4-1}$ as the execution outputs. Additionally, if the execution of application D and previous second execution of application A are not executed on the same host, then generated execution results data 396-1 may be first transferred to the knowledge datastore 110 from the host executing application A for the second time and then transferred from the knowledge datastore 110 to the host executing analytic application D.

With respect to the second analytic workflow execution path, at step 358-3-2, the analytic application C may be requested for execution and perform analysis on and/or further modifications to execution results data 394 as the execution input, which may include modified source data$_2$ and/or artifact data$_2$. The analytic application C may further generate execution results data 396-2 which may include modified source data$_{3-2}$ and/or artifact data$_{3-2}$ as the execution outputs. Additionally, if the execution of application C and previous execution of application B are not executed on the same host, then generated execution results data 394 may be first transferred to the knowledge datastore 110 from the host that executed application B and then transferred from the knowledge datastore 110 to the host executing analytic application C.

With respect to the second analytic workflow execution path, at step 358-4, the analytic application D may be requested for execution and perform analysis on and/or further modifications to execution results data 396-2 as the execution input, which may include modified source data$_{3-2}$ and/or artifact data$_{3-2}$. The analytic application D may further generate execution results data 398-2, which may include modified source data$_{4-2}$ and/or artifact data$_{4-2}$, as the execution output. Additionally, if the execution of application D and previous execution of application C are not executed on the same host, then generated execution results data 396-2 may be first transferred to the knowledge datastore 110 from the host executing application C and then transferred from the knowledge datastore 110 to the host executing analytic application D.

It may be appreciated that while analytic workflow 358 illustrates two alternate execution paths, the execution of the analytic applications A and B, which are shared between both execution paths, may be executed only once when the shared executions of applications A and B would also generate the same execution results data. This may occur, for example, when the execution parameters for the execution of analytic applications A and B and the source data$_1$ 360 may be the same when the analytic workflow 358 is executed with respect to both paths.

Additionally, some or all of the generated artifact data and/or modified source data may be persisted on the knowledge datastore 110 for post processing by the analytics component 228. This persistence on the knowledge datastore 110 ensures that worthwhile results should outlive the execution of one or more analytic applications so that these execution results can be accessed even after an analytic workflow associated with a research project and/or research thread has ended. This persistence may also ensure that these execution results may be used for future research projects and/or research threads. Furthermore, this persistence may also provide duplication that can protect important execution results in the event that an analytic machine executing an analytic application fails and/or becomes corrupt. In addition, this persistence may also decouple the analytic processing by one or more analytic applications from the visual presentation and further post processing of the execution results. This decoupling may enable the analytics processing to be performed asynchronously with respect to visual presentation and further post processing of the execution results.

Figure 4A:
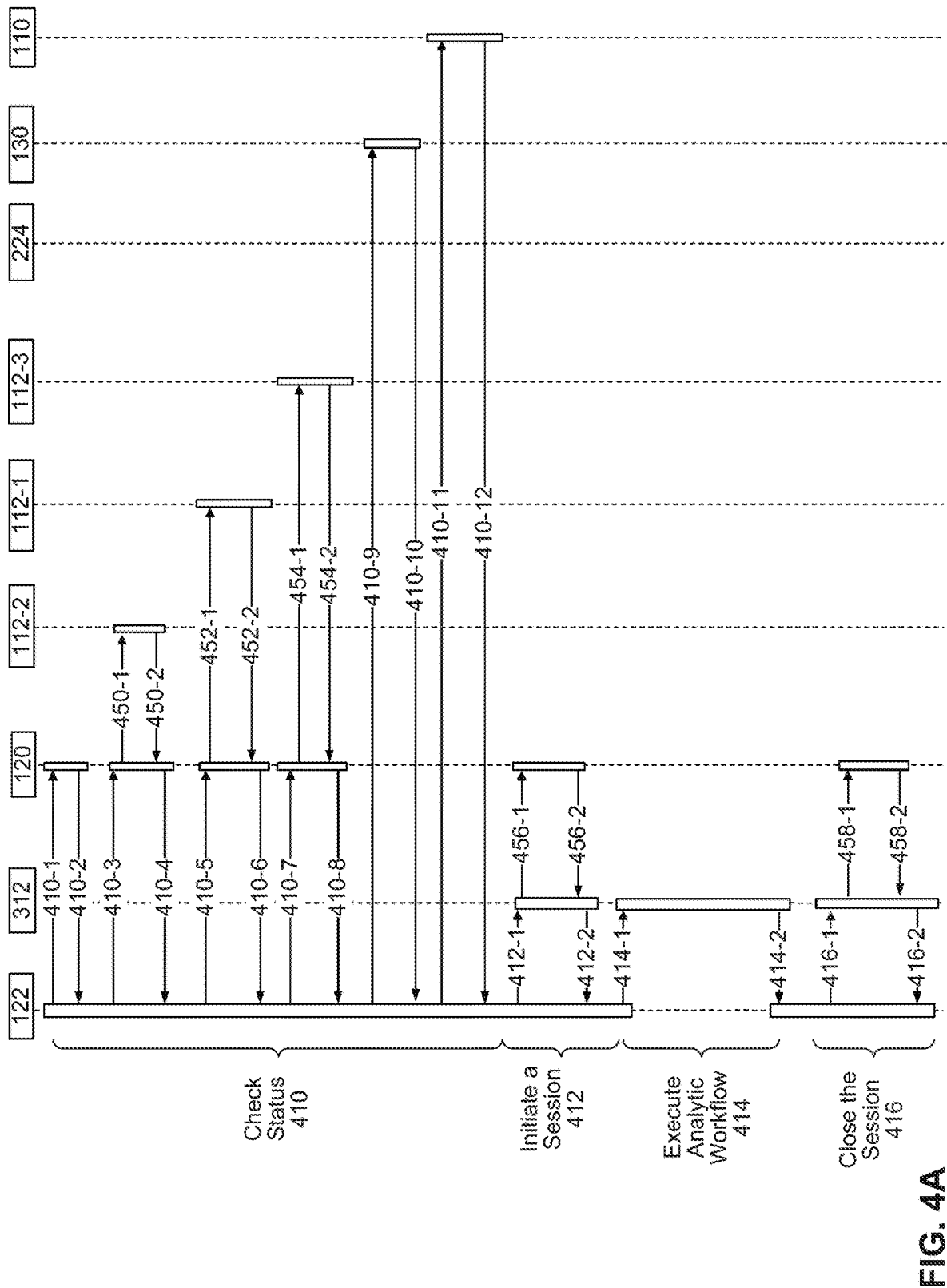
FIGS. 4A-4C illustrate sequence diagrams of example embodiment(s) of a cross cloud analytics system of an example embodiment.
Figure 4B:
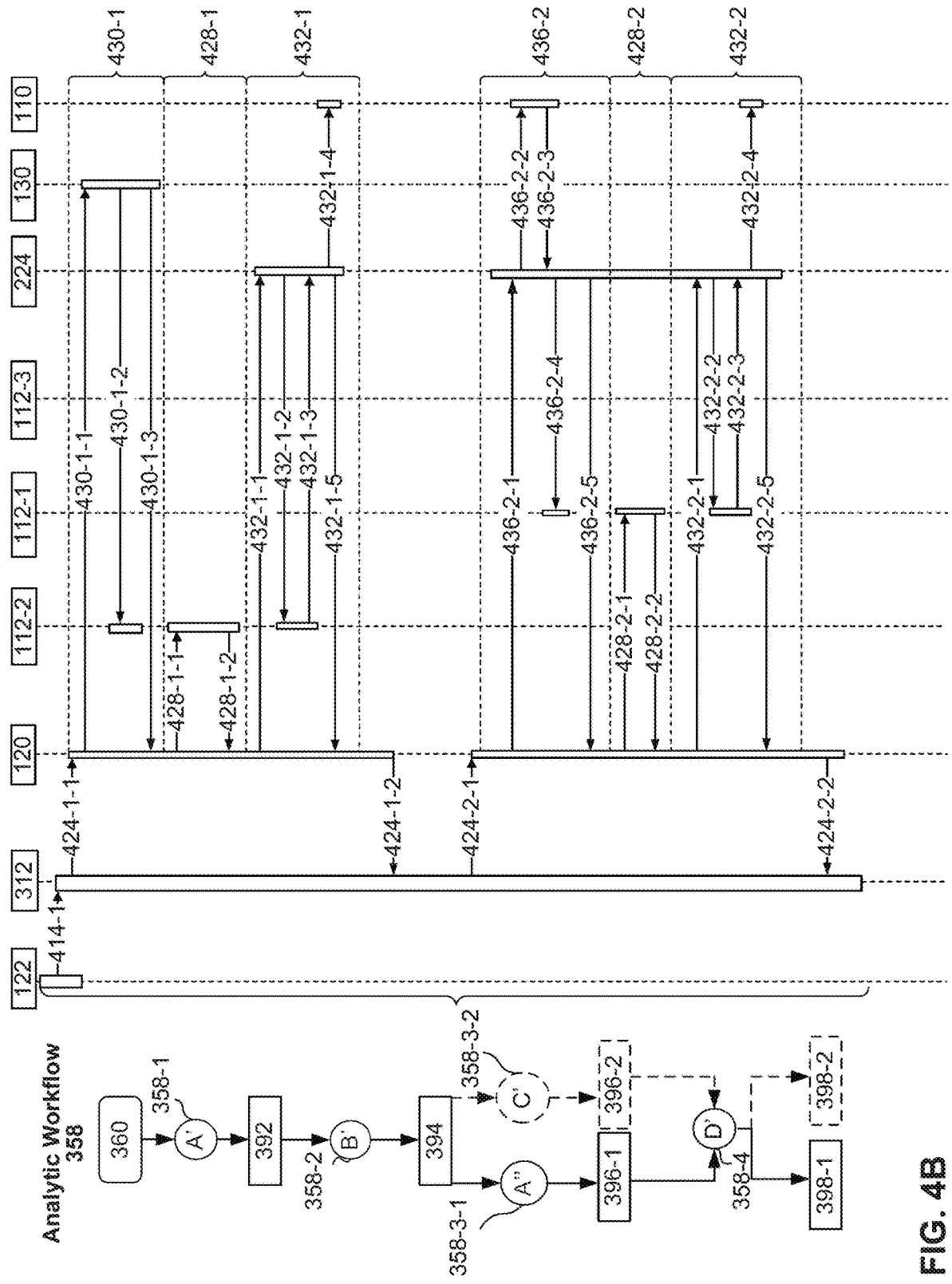
Figure 4C:
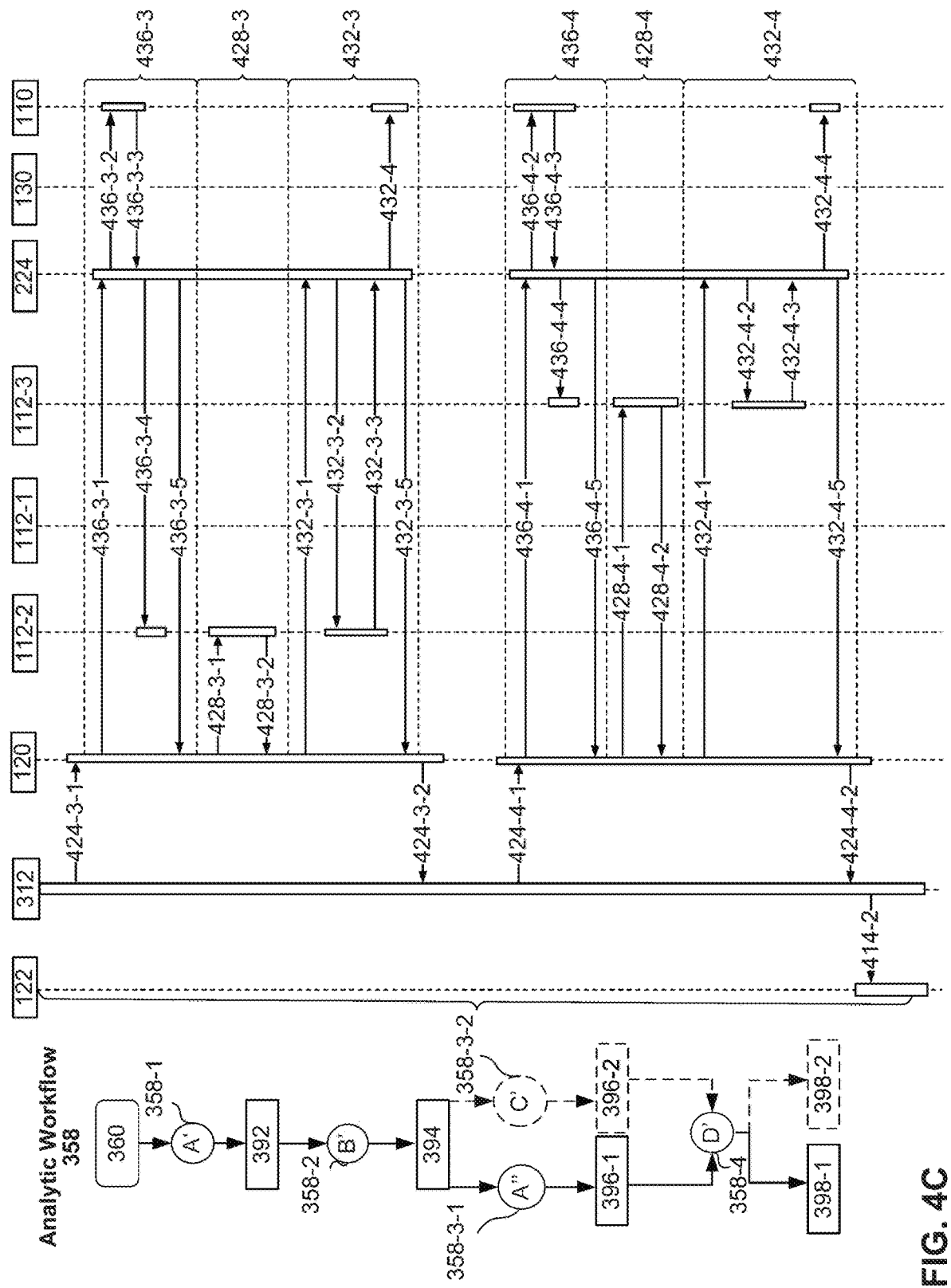

FIGS. 4A-4C illustrate sequence diagram(s) of embodiment(s) of the cross cloud analytics system in an example embodiment.

In the example embodiment illustrated in FIG. 4A, an analyst or researcher may request the execution of an analytic workflow (e.g., analytic workflow 358). In response to the request from the analyst or researcher, the executive service application 122 may be configured to check status 410 of the C&C service application 120, the one or more analytics computing environments 112-a (e.g., analytics computing environment 112-2, 112-1, and 112-3), the storage system 130, and the knowledge application 128.

To check status 410, at step 410-1 the executive service application 122 may transmit a C&C request to check the status of the C&C service application 120. At step 410-2, the C&C service application 120 may transmit a C&C response to the executive service application 122 indicating whether the C&C service application 120 is operational or whether there is an error.

At step 410-3, the executive service application 122 may be configured to transmit a C&C request to the C&C service application 120 in order to check status of analytics computing environment 112-2, when the C&C response at step 410-2 indicates that the status of the C&C service application 120 is operational. At step 450-1, the C&C service application 120 may be configured to transmit a native access request to check the status of analytics computing environment 112-2, in response to receiving the C&C request transmitted at step 410-3. At step 450-2, the analytics computing environment 112-2 may transmit a native access response to the C&C service application 120 indicating whether the status of the analytics computing environment 112-2 is operational or whether there is an error. At step 410-4, the C&C service application 120 may transmit a C&C response indicating the status of the analytics computing environment 112-2 to the executive service application 122 based on the received native access response.

At step 410-5, the executive service application 122 may also be configured to transmit a C&C request to the C&C service application 120 in order to check status of analytics computing environment 112-1, when the C&C response at step 410-2 indicates that the status of the C&C service application 120 is operational. At step 452-1, the C&C service application 120 may be configured to transmit a native access request to check the status of analytics computing environment 112-1, in response to receiving the executive request transmitted at step 410-5. At step 452-2, the analytics computing environment 112-1 may transmit a native access response to the C&C service application 120 indicating whether the status of the analytics computing environment 112-1 is operational or whether there is an error. At step 410-6, the C&C service application 120 may transmit a C&C response indicating the status of the analytics computing environment 112-1 to the executive service application 122 based on the received native access response.

At step 410-7, the executive service application 122 may also be configured to transmit a C&C request to the C&C service application 120 in order to check status of analytics computing environment 112-3, when the C&C response at step 410-2 indicates that the status of the C&C service application 120 is operational. At step 454-1, the C&C service application 120 may be configured to transmit a native request to check the status of analytics computing environment 112-3, in response to receiving the executive request transmitted at step 410-7. At step 454-2, the analytics computing environment 112-3 may transmit a native access response to the C&C service application 120 indicating whether the status of the analytics computing environment 112-3 is operational or whether there is an error. At step 410-8, the C&C service application 120 may transmit a C&C response indicating the status of the analytics computing environment 112-3 to the executive service application 122 based on the received native access response.

After the executive service application 122 determines that the status of C&C service application 120, the one or more analytics computing environments 112-a, the storage system 130, and the knowledge datastore 110 that may be required for execution of the analytic workflow are all operational, the executive service application 122 may be configured to initiate a session 412 for the execution of an analytic workflow (e.g., analytic workflow 358).

To initiate a session 412, at step 412-1, the executive service application 122 may be configured to transmit a workflow request to the workflow component 312 to initiate the workflow component 312 for the execution of an analytic workflow. At step 456-1, the workflow component 312 may transmit a C&C request to the C&C service application 120 to initiate or connect to a session for the execution of an analytic workflow, in response to the C&C request transmitted at step 412-1. At step 456-2, the C&C service application 120 may transmit a C&C response indicating the acknowledgement of the C&C request transmitted at step 456-1. The response may further include, session identifier information (e.g., an alpha-numeric identifier or value, etc.) that identifies the initiated session for executing the analytic workflow. At step 412-2, the workflow component 312 may transmit a workflow response indicating the initiation of a session, where the workflow response may further include the session identifier information.

After the executive service application 122 initiates the session, the executive service application 122 may request to execute analytic workflow 414. To execute an analytic workflow, at step 414-1, the executive service application 122 may transmit a workflow request that requests the execution of an analytic workflow (e.g., analytic workflow 358) to the workflow component 312. At step 414-2, the workflow component 312 may transmit a workflow response indicating the completion of the execution of the analytic workflow initiated at step 414-1. The workflow response may also include any execution error information indicating any errors that may have occurred during the execution of the analytic workflow. For example, the errors may include, without limitation, analytic application timeouts, analytic application execution errors, analytic machine errors, and/or the like.

After the execution of the analytic workflow, the executive service application 122 may close the session 416. To close the session, at step 416-1, the executive service application 122 may transmit a workflow request to the workflow component 312 to close the session initiated at step 412-1. The workflow request may include the session identifier information to identify the session to be closed. At step 458-1, the workflow component 312 may transmit a C&C request to the C&C service application 120 to close or disconnect from the session. The C&C request may include the session identifier information to identify the session to be closed. At step 458-2, the C&C service application 120 may transmit a C&C response acknowledging the closure of the session. At step 416-2, the workflow component 312 may transmit a workflow response to the executive service application 122 acknowledging the closure of the session.

It may be appreciated that after the session is closed, the execution service application 122 may be further configured to notify and/or provide the execution error information to an analyst or researcher so that the errors can be corrected and the analytic workflow may be re-executed, if needed.

FIG. 4B illustrates an example embodiment of the execution of the analytic workflow 358. Each execution of an analytic application may be associated with one or more phases, the one or more phases may include, without limitation, the input initiation phase, the application execution phase, and/or output transfer phase.

The execution of the analytic workflow 358 may begin at step 424-1-1. At step 424-1-1 the workflow component 312 may transmit a C&C request to the C&C service application 120 to execute analytic application A. The C&C request may include execution information and execution session information identifying the session associated with the execution of analytic application A. The execution information may include, without limitation, execution identifier information (e.g., an alpha-numeric identifier or value, etc.) that identifies the instance of analytic application execution, the execution application information identifying analytic application A, execution host information identifying analytics computing environment 112-2, execution parameters information identifying any parameters for the analytic application A to be executed, execution input information identifying immutable source data 360, and/or execution output information identifying execution result data 392.

After receiving the C&C request from workflow component 312 at step 424-1-1, the input initiation phase 430 may begin at step 430-1-1. At step 430-1-1, the C&C service application 120 may transmit a storage request to the storage system 130 to request the transfer of immutable source data$_1$ 360 to the analytics computing environment 112-2. At step 430-1-2, the storage system 130 may transfer the immutable source data$_1$ 360 to the analytics computing environment 112-2. The transfer of the immutable source data$_1$ 360 may utilize a protocol native to the analytics computing environment 112-2, i.e., a second native protocol. At step 430-1-3, the storage system 130 may transmit a storage response to the C&C service application 120 indicating the completion of the transfer of the immutable source data$_1$ 360.

After receiving the storage response from the storage system 130 at step 430-1-3, the application execution phase 428-1 corresponding to step 358-1 in the analytic workflow 358 may begin at step 428-1-1. At step 428-1-1, the C&C service application 120 may transmit a native access request to the analytics computing environment 112-2 utilizing the second native protocol that is specific to analytics computing environment 112-2. The native request may include the previously discussed execution information to execute the analytic application A. Additionally, before the execution of the analytic application A, the analytics computing environment 112-2 may profile, filter, and/or configure the copied or cloned source data$_1$ 360 to a data model and/or format consistent with the data model and/or format utilized by the analytics computing environment 112-2 and analytic application A. At step 428-1-2, the analytics computing environment 112-2 may transmit a native access response to the C&C service application 120 indicating the completion of the execution of analytic application A. The native response may also include any execution error information.

After receiving the native access response from the analytics computing environment 112-2 at step 428-1-2, the output transfer phase 432-1 may begin at step 432-1-1. At step 432-1-1, the C&C service application 120 may transmit an adapter request to the adapter component 224 to request the transfer of execution results data 392 from the analytics computing environment 112-2 to the knowledge datastore 110. The adapter request may include the execution output information identifying execution result data 392 and execution host information identifying analytics computing environment 112-2. At step 432-1-2, the adapter component 224 may transmit a native access request to retrieve or fetch execution results data 392. At step 432-1-3, the adapter component 224 may receive the execution results data 392 from the analytics computing environment 112-2. At step 432-1-4, the adapter component 224 may adapt or configure the execution results data 392 to one or more data models that is consistent with data models (e.g., ontology data models, etc.) of the knowledge datastore 110 and transmit the adapted execution results data 392 to the knowledge datastore 110 for storage and/or further post processing. At step 432-1-5, the adapter component 224 may transmit an adapter response to the C&C service component 120 indicating the completion of the transfer of the execution results data 392.

At step 424-1-2, the C&C service application 120 may transmit a C&C response to the workflow component 312 indicating the completion of the execution of analytic application A corresponding to step 358-1 of the analytic workflow 358. The C&C response may also include execution error information. After the execution of analytic application A has completed, the workflow component 312 may execute the analytic application B illustrated in analytic workflow 358 as step 358-2.

At step 424-2-1 the workflow component 312 may transmit a C&C request to the C&C service application 120 to execute analytic application B. The C&C request may include execution information and execution session information identifying the session associated with the execution of analytic application B. The execution information may include, without limitation, execution identifier information (e.g., an alpha-numeric identifier or value, etc.) that identifies the instance of execution of analytic application B, the execution application information identifying analytic application B, execution host information identifying analytics computing environment 112-1, execution parameters information identifying any parameters for the analytic application B to be executed, execution input information identifying execution result data 392, and/or execution output information identifying execution result data 394.

After receiving the C&C request from workflow component 312 at step 424-2-1, the input initiation phase 436-2 may begin at step 436-2-1. At step 436-2-1, the C&C service application 120 may transmit an adapter request to the adapter component 224 to request the transfer of execution results data 392 identified by the execution input information to the analytics computing environment 112-1. The adapter request may include the execution host information identifying the analytics computing environment 112-1 and/or execution input information identifying the execution results data 392. At step 436-2-2, the adapter component 224 may transmit a knowledge request to the knowledge datastore 110 to request the retrieval of the execution results data 392 identified by the execution input information. At step 436-2-3, the adapter component 224 may receive the execution results data 392. At step 436-2-4, the adapter component 224 may transmit the execution results data 392 to the analytics computing environment 112-1. Optionally, the adapter component 224 may adapt or configure the retrieved execution results data 392 to a data model consistent with analytics computing environment 112-1 and the analytic application B before transferring the execution results data 392. Additionally, the transfer of the execution results data 392 may utilize a protocol native to the analytics computing environment 112-1, i.e., a first native protocol. At step 436-2-5, the adapter component 224 may transmit an adapter response to the C&C service application 120 indicating the completion of the transfer of the execution results data 392 to the analytics computing environment 112-1.

After receiving the adapter response from the adapter component 224 at step 436-2-5, the application execution phase 428-2 corresponding to step 358-2 in the analytic workflow 358 may begin at step 428-2-1. At step 428-2-1, the C&C service application 120 may transmit a native access request to the analytics computing environment 112-1 utilizing the first native protocol that is specific to analytics computing environment 112-1 to execute the analytic application B. The native access request may include the previously discussed execution information. At step 428-1-2, the analytics computing environment 112-2 may transmit a native access response to the C&C service application 120 indicating the completion of the execution of analytic application B utilizing the first native protocol. The native response may also include any execution error information.

After receiving the native access response from the analytics computing environment 112-1 at step 428-2-2, the output transfer phase 432-2 may begin at step 432-2-1. At step 432-2-1, the C&C service application 120 may transmit an adapter request to the adapter component 224 to request the transfer of execution results data 394 from the analytics computing environment 112-1 to the knowledge datastore 110. The adapter request may include the execution output information identifying execution result data 394 and execution host information identifying analytics computing environment 112-1. At step 432-2-2, the adapter component 224 may transmit a native access request to retrieve or fetch execution results data 394 utilizing the first native protocol. At step 432-2-3, the adapter component 224 may receive the execution results data 394 from the analytics computing environment 112-1. At step 432-2-4, the adapter component 224 may adapt or configure the execution results data 392 to one or more data models that is consistent with data models (e.g., the ontology data models, etc.) of the knowledge datastore 110 and transmit the adapted execution results data 394 to the knowledge datastore 110 for storage and/or post processing. At step 432-2-5, the adapter component 224 may transmit an adapter response to the C&C service component 120 indicating the completion of the transfer of the execution results data 394.

At step 424-2-2, the C&C service application 120 may transmit a C&C response to the workflow component 312 indicating the completion of the execution of analytic application B corresponding to step 358-2 of the analytic workflow 358. The C&C response may also include execution error information. After the execution of analytic application B has completed, the workflow component 312 may again execute the analytic application A illustrated in analytic workflow 358 as step 358-3-1 which is further illustrated in FIG. 4C.

The execution of the analytic workflow 358 may continue at step 424-3-1 in FIG. 4C. At step 424-3-1, the workflow component 312 may transmit a C&C request to the C&C service application 120 to again execute analytic application A. The C&C request may include execution information and execution session information identifying the session associated with the execution of analytic application A. The execution information may include, without limitation, execution identifier information (e.g., an alpha-numeric identifier or value, etc.) that identifies the instance of execution of analytic application A, execution application information identifying analytic application A, execution host information identifying analytics computing environment 112-2, execution parameters information identifying any parameters for the analytic application A to be executed, execution input information identifying execution results data 394, and/or execution output information identifying execution results data 396-1.

After receiving the C&C request from workflow component 312 at step 424-3-1, the input initiation phase 436-3 may begin at step 436-3-1. At step 436-3-1, the C&C service application 120 may transmit an adapter request to the adapter component 224 to request the transfer of execution results data 394 identified by the execution input information to the analytics computing environment 112-2. The adapter request may include the execution host information identifying the analytics computing environment 112-1 and/or execution input information identifying the execution results data 394. At step 436-3-2, the adapter component 224 may transmit a knowledge request to the knowledge datastore 110 to request the retrieval of the execution results data 394 identified by the execution input information. At step 436-3-3, the adapter component 224 may receive the execution results data 394. At step 436-3-4, the adapter component 224 may transmit the execution results data 394 to the analytics computing environment 112-2. Optionally, the adapter component 224 may adapt or configure the retrieved execution results data 394 to a data model consistent with analytics computing environment 112-2 and the analytic application B before transferring the execution results data 392. The transfer of the execution results data 394 may also utilize the second native protocol as previously discussed. At step 436-3-5, the adapter component 224 may transmit an adapter response to the C&C service application 120 indicating the completion of the transfer of the execution results data 394 to the analytics computing environment 112-2.

After receiving the adapter response from the adapter component 224 at step 436-3-5, the application execution phase 428-3 corresponding to step 358-3-1 in the analytic workflow 358 may begin at step 428-3-1. At step 428-3-1, the C&C service application 120 may transmit a native access request to the analytics computing environment 112-2 utilizing the second native protocol to execute the analytic application A for the second time. The native request may include the previously discussed execution information. At step 428-3-2, the analytics computing environment 112-2 may transmit a native access response to the C&C service application 120 indicating the completion of the execution of analytic application A utilizing the second native protocol. The native access response may also include any execution error information.

After receiving the native access response from the analytics computing environment 112-2 at step 428-3-2, the output transfer phase 432-3 may begin at step 432-3-1. At step 432-3-1, the C&C service application 120 may transmit an adapter request to the adapter component 224 to request the transfer of execution results data 396-1 from the analytics computing environment 112-2 to the knowledge datastore 110. The adapter request may include the execution output information identifying execution result data 396-1 and execution host information identifying analytics computing environment 112-2. At step 432-3-2, the adapter component 224 may transmit a native access request to retrieve or fetch execution results data 396-1. At step 432-3-3, the adapter component 224 may receive the execution results data 396-1 from the analytics computing environment 112-2. At step 432-3-4, the adapter component 224 may adapt or configure the execution results data 396-1 to data models consistent with data models (e.g., ontology data models, etc.) of the knowledge datastore 110 and transmit the adapted execution results data 396-1 to the knowledge datastore 110 for storage and/or further post processing. At step 432-3-5, the adapter component 224 may transmit an adapter response to the C&C service component 120 indicating the completion of the transfer of the execution results data 396-1.

At step 424-3-2, the C&C service application 120 may transmit a C&C response to the workflow component 312 indicating the completion of the second execution of analytic application A corresponding to step 358-3-1 of the analytic workflow 358. The C&C response may also include execution error information. After the second execution of analytic application A has completed, the workflow component 312 may then execute the analytic application D illustrated in analytic workflow 358 as step 358-4.

At step 424-4-1 the workflow component 312 may transmit a C&C request to the C&C service application 120 to execute analytic application D, the C&C request may include execution information and execution session information identifying the session associated with the execution of analytic application D. The execution information may include, without limitation, execution identifier information (e.g., an alpha-numeric identifier or value, etc.) that identifies the instance of execution of analytic application D, the execution application information identifying analytic application D, execution host information identifying analytics computing environment 112-3, execution parameters information identifying any parameters for the analytic application D to be executed, execution input information identifying execution result data 396-1, and/or execution output information identifying execution result data 398-1.

After receiving the C&C request from workflow component 312 at step 424-4-1, the input initiation phase 436-4 may begin at step 436-4-1. At step 436-4-1, the C&C service application 120 may transmit an adapter request to the adapter component 224 to request the transfer of execution results data 396-1 identified by the execution input information to the analytics computing environment 112-3. The adapter request may include the execution host information identifying the analytics computing environment 112-3 and/ or execution input information identifying the execution results data 396-1. At step 436-4-2, the adapter component 224 may transmit a knowledge request to the knowledge datastore 110 to request the retrieval of the execution results data 396-1 identified by the execution input information. At step 436-4-3, the adapter component 224 may receive the execution results data 396-1. At step 436-4-4, the adapter component 224 may transmit the execution results data 396-1 to the analytics computing environment 112-1. Optionally, the adapter component 224 may adapt or configure the retrieved execution results data 396-1 to a data model consistent with analytics computing environment 112-3 and the analytic application B before transferring the execution results data 396-1. The transfer of the execution results data 396-1 may utilize a protocol native to the analytics computing environment 112-3, i.e., a third native protocol. At step 436-4-5, the adapter component 224 may transmit an adapter response to the C&C service application 120 indicating the completion of the transfer of the execution results data 396-1 to the analytics computing environment 112-3.

After receiving the adapter response from the adapter component 224 at step 436-4-5, the application execution phase 428-4 corresponding to step 358-4 in the analytic workflow 358 may begin at step 428-4-1. At step 428-4-1, the C&C service application 120 may transmit a native access request to the analytics computing environment 112-3 utilizing the third native access protocol that is specific to analytics computing environment 112-3 to execute analytic application D. The native access request may include the previously discussed execution information. At step 428-4-2, the analytics computing environment 112-3 may transmit a native access response to the C&C service application 120 indicating the completion of the execution of analytic application D utilizing the third native protocol. The native response may also include any execution error information.

After receiving the native response from the analytics computing environment 112-3 at step 428-4-2, the output transfer phase 432-4 may begin at step 432-4-1. At step 432-4-1, the C&C service application 120 may transmit an adapter request to the adapter component 224 to request the transfer of execution results data 398-1 from the analytics computing environment 112-3 to the knowledge datastore 110. The adapter request may include the execution output information identifying execution result data 398-1 and execution host information identifying analytics computing environment 112-3. At step 432-4-2, the adapter component 224 may transmit a native access request to retrieve or fetch execution results data 398-1 utilizing the third native protocol. At step 432-4-3, the adapter component 224 may receive the execution results data 398-1 from the analytics computing environment 112-3. At step 432-4-4, the adapter component 224 may adapt or configure the execution results data 398-1 to one or more data models consistent with data models (e.g., the ontology data models, etc.) of the knowledge datastore 110 and transmit the adapted execution results data 398-1 to the knowledge datastore 110 for storage, visual presentation, and/or further post processing. At step 432-4-5, the adapter component 224 may transmit an adapter response to the C&C service component 120 indicating the completion of the transfer of the execution results data 398-1.

At step 424-4-2, the C&C service application 120 may transmit a C&C response to the workflow component 312 indicating the completion of the execution of analytic application D corresponding to step 358-4 of the analytic workflow 358. The C&C response may also include execution error information. After the execution of analytic application D has completed, the workflow component 312 may transmit a workflow response indicating the completion of the execution of the analytic workflow as discussed with respect to FIG. 4A.

It may be appreciated that while only the first workflow execution path of analytic workflow 358 has been illustrated and discussed in detail in the example embodiment of FIGS. 4B-4C, the second workflow execution path of analytic workflow 358 may be similarly executed as the first workflow execution path illustrated in FIGS. 4B-4C. Additionally, while FIGS. 4A-4C illustrate the workflow component 312 initiating a single session with the C&C service application 120 for the execution of analytic workflow 358, in some implementations, the workflow component 312 may simultaneously and/or asynchronously initiate multiple sessions with the C&C service application 120, where each session may be configured to execute a different analytic workflow.

It may be further appreciated that the workflow component 312 may be configured to determine analytic application execution status (e.g., running, completed, canceled, erroring out, retired, etc.) in one or more analytic workflows on one or more analytic computing environments by transmitting an C&C request, including at least a portion of the execution information (e.g., execution identifier information, etc.) to the C&C service application 120 in a similar manner as illustrated in FIG. 4A. The workflow component 312 may also be configured to cancel a pending analytic application execution by also transmitting one or more C&C requests including at least a portion of the execution information (e.g., execution identifier information, etc.) to the C&C service application 120.

FIG. 5 illustrates a block diagram of provenance class information according to an example embodiment.

In order to determine the history of generated analytics data (e.g., artifact data and/or modified source data) and the context during the execution of an analytic workflow, the one or more analytics computing environments 112-*a* may be configured to generate and/or update provenance data represented as provenance class information (provenance class information 512-1, 512-2, 512-3, and 512-4) for each analytic application execution, based at least partially on the execution information.

In an embodiment, the provenance class information may be utilized to determine provenance in the context of an analytic workflow, which may be representative of the derivation history of analytics data generated by the one or more analytics computing environments 112-*a*. The derivation history may describe one or more activities of analytic applications that informed the analytic data's creation. The provenance may then be used to provide insight into the trustworthiness of the generated analytic data which may ultimately assist analysts and researchers to document their research and make an informed decision based on analytics data and/or provenance class information.

In an embodiment, each of the analytic machines (e.g., standalone server devices and/or virtual machines) of the one or more analytics computing environments 112-*a* may be configured to generate the provenance class information for each analytic application. The provenance class information for a particular analytic application may include provenance instance information for all the equivalent analytic applications that were executed in the same analytics computing environments 112-*a*. The provenance instance information for each analytic application execution may include, without limitation, provenance application information identifying the analytic application, provenance application version information identifying the version of the analytic application, provenance timestamp information identifying time and date of the analytic application execution, provenance parameters information identifying execution parameters of the analytic application, the provenance execution inputs information identifying the execution inputs of the analytic application, and/or provenance execution outputs information identifying the execution outputs of the analytic application.

For example, some or all provenance instance information generated from executions of analytic application A may be aggregated in the provenance class information for analytic application A. Similarly, some or all provenance instance information generated from executions of analytic application B may be aggregated in the provenance class information for analytic application B. Thus, it may be appreciated the provenance class information may serve the role of a hub that bridges equivalent analytic applications that may be repeatedly executed in analytic workflows with varying execution parameters, execution inputs, and/or execution outputs that may have generated analytics data in various workflow executions.

By way of example and with respect to a first execution path of the analytic workflow 358, the analytics computing environment 112-2 may generate and update provenance class information 512-1 for analytic application A, where the provenance class information 512-1 may include provenance instance information associated with the execution of analytic application A at step 358-1 and the re-execution of analytic application A at 358-3-1. The analytics computing environment 112-1 may generate provenance class information 512-2 for analytic application B, where the provenance class information 512-1 may include provenance instance information associated with the execution of analytic application B at step 358-2. The analytics computing environment 112-3 may generate provenance class information 512-4 for analytic application D, where the provenance class information 512-4 may include provenance instance information associated with the execution of analytic application D at step 358-4.

Continuing with the above example and during the execution of a second path of the analytic workflow 358, the analytics computing environment 112-2 may update provenance class information 512-1 for analytic application A to further include provenance instance information associated with the execution of analytic application A at step 358-1. The analytics computing environment 112-1 may also update provenance class information 512-2 for analytic application B to include provenance instance information associated with the execution of analytic application B at step 358-2. The analytics computing environment 112-4 (not shown), which may be configured to execute analytic application C at step 358-3-2, may generate provenance class information 512-3 for analytic application C, where the provenance class information 512-3 may include provenance instance information associated with the execution of analytic application C at step 358-3. The analytics computing environment 112-3 may update provenance class information 512-4 for analytic application D to include provenance instance information associated with the execution of analytic application D at step 358-4.

In an embodiment, the generated provenance class information may be transmitted to the knowledge datastore 110 and stored in the provenance datastore 222 for further analysis by the analytics component 228 after each generation or update of the generated provenance class information. Additionally or alternatively, the generated provenance class information for one or more analytic applications may be transmitted, after the execution of all of the one or more analytic applications in an analytic workflow. Additionally or alternatively, the generated provenance class information may also be stored on respective analytics computing environments 112-*a* and provided in response to one or more native access request requesting for provenance class information.

Once the provenance class information is generated and/or further analyzed, the provenance class information for each analytic application may enable the generation of one or more provenance graphs illustrating the one or more execution instances, such as, for example, workflow execution instance 550-1 and workflow execution instance 550-2 to assist the analysts and researchers in determining which analytic process are being executed multiple times in a workflow involving a particular sets of source data and/or analytic data.

It may be appreciated that while above example embodiments illustrated in FIGS. 3A-E, 4A-4C, and 5 may have been described with respect to applications A, B, C, D and analytics computing environments 112-1, 112-2, and 112-3, the example embodiments are not limited to those example analytic applications and analytics computing environments.

Figures 6A, 6B:
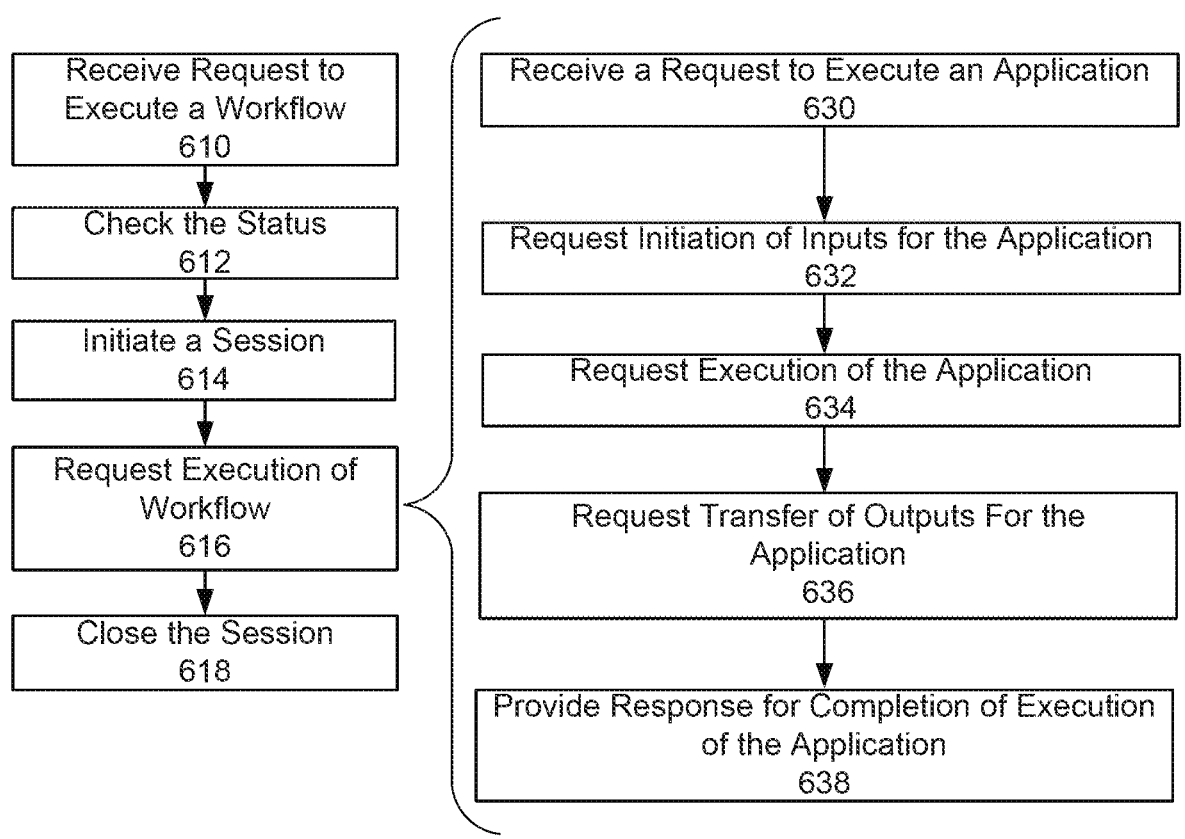
FIGS. 6A-6B illustrate processing operations that may be performed by the cross cloud analytics system according to example embodiments.

FIGS. 6A-6B illustrate processing operations that may be performed by one or more devices, applications, and/or components of the cross cloud analytics system 100.

As illustrated in FIG. 6A, at step 610, the executive service application 122 may receive a request to execute a workflow. For example, executive service application 122 may receive a request from an analyst or researcher to execute analytic workflow 358. At step 612, executive service application 122 may check the status of one or more devices, applications, and/or components. For example, the executive service application 122 may determine the operational status of C&C service application 120, the one or more analytics computing environments 112-1, 112-2, 112-3, the storage system 130, and/or knowledge datastore 110 necessary for the execution of the analytic workflow 358.

At step 614, executive service application 122 may initiate a session. For example, executive service application 122 may initiate a session with the C&C service application 120 via the workflow component 312 for the execution of the analytic workflow 358. At step 616, the executive service application 122 may request the execution of workflow. For example, executive service application 122 may request the workflow component 312 to execute the analytic workflow 358. The one or more steps associated with the execution of the analytic workflow 358 across one or more analytics computing environments 112-1, 112-2, and 112-3 is further discussed with respect to FIG. 6B. At step 618, the executive service application 122 may close the session. For example, the executive service application 122 may close the previously initiated session at step 614, after the execution of the analytic workflow 358 has completed.

As illustrated in FIG. 6B, at step 630, C&C service application 120 may receive a request to execute an application. For example, for each analytic application to be executed in an analytic workflow such as, analytic workflow 358, the C&C service application 120 may receive request to execute an analytic application (e.g. analytic application A, etc.).

At step 632, the C&C service application 120 may request initiation of inputs for the application. For example, for each analytic application to be executed in the analytic workflow, such as, analytic workflow 358, the C&C service application 120 may initiate the inputs for an analytic application (e.g., analytic application A, etc.) to be executed. The C&C service application 120 may request to initiate inputs by requesting the storage system 130 to transfer data identified by execution input information (e.g., source data 360) to an analytics computing environment identified by the execution host information (e.g., analytics computing environment 112-2, etc.), utilizing a second access protocol that is specific to the identified analytics computing environment (e.g., analytics computing environment 112-2, etc.).

Additionally or alternatively, the C&C service application 120 may also request to initiate inputs by requesting the adapter component 224 to transfer data identified by execution input information (e.g., execution results data including modified source data and/or artifact data, etc.) to the analytics computing environment identified by the execution host information also utilizing the second access protocol. The adapter component 224 may also adapt or convert the analytics data identified by the execution input information to a data model and/or format utilized by identified analytics computing environment and identified analytic application.

At step 634, the C&C service application 120 may request execution of the application. For example, for each analytic application to be executed in an analytic workflow, such as, analytic workflow 358, the C&C service application 120 may request execution of the analytic application (e.g., analytic application A, etc.) by transmitting a native access request to analytics computing environment identified by the execution host information (e.g., analytics computing environment 112-2). The native access request may request the identified analytics computing environment to execute the analytic application (e.g., analytic application A, etc.) identified by the execution information (e.g., execution application information identifying the analytic application A, execution parameters information identifying the parameters for the execution of analytic application A, etc.).

At step 636, the C&C service application 120 may request transfer of outputs for the application. For example, for each analytic application to be executed in an analytic workflow, such as, analytic workflow 358, the C&C service application 120 may transmit an adapter request to the adapter component 224 to transfer outputs of the executed analytic application identified by the execution output information (e.g., execution results data 392 including modified source data$_1$ and/or artifact data$_1$, etc.) from the analytics computing environment identified by the execution host information to the adapter component 224. The adapter component 224 may further adapt or convert the outputs identified by the execution output information to a data model and/or format consistent with one or more data models (e.g., ontology data model, etc.) in the knowledge datastore 110. The adapter component 224 may further transfer the adapted outputs to the knowledge datastore 110.

Additionally or alternatively, the outputs may further include provenance data generated by the analytics computing environment (e.g., analytics computing environment 112-2, etc.) from the execution of the analytic application (e.g., analytic application A, etc.). The provenance data may include provenance class information for the analytic application (e.g., analytic application A, etc.) that was executed in the analytics computing environment (e.g., analytics computing environment 112-2, etc.). The provenance class information may further include the provenance instance information identifying derivation history of the execution output information (e.g., execution results data 392 including modified source data$_1$ and/or artifact data$_1$, etc.). The adapter component 224 may further associate the generated provenance class information with the data identified by the execution output information and store the provenance class information in the knowledge datastore 110 (e.g., provenance datastore 222, etc.)

At step 638, the C&C service application 120 may provide response for completion of execution of the application. For example, for each analytic application to be executed in an analytic workflow, such as, analytic workflow 358, the C&C service application 120 may transmit a C&C response to the workflow component 312 to indicate the completion of the execution of the analytic application (e.g., analytic application A). The C&C response may also include execution error information identifying any errors that may have occurred during the execution of the analytic application.

It may be appreciated that steps 630, 632, 634, 636, 638, or any combination thereof may be repeatedly performed as discussed above, for each of the one or more analytic applications in an analytic workflow, such as, analysis workflow 358, until all analytic applications have been executed. It may be further appreciated that the execution of the one or more analytic applications may occur in one or more sequences and/or simultaneously based on any dependencies of inputs and/outputs of the more one or more analytic applications.

Example Computer System

Various embodiments and components therein can be implemented, for example, using one or more well-known computer systems, such as, for example, C&C server device 124, executive server device 118, storage server devices 132-b, knowledge device 116, standalone server devices 334-c, and/or physical server devices 342-a-m and 342-a-n. Computer system 700 can be any well-known computer capable of performing the functions described herein.

Figure 7:
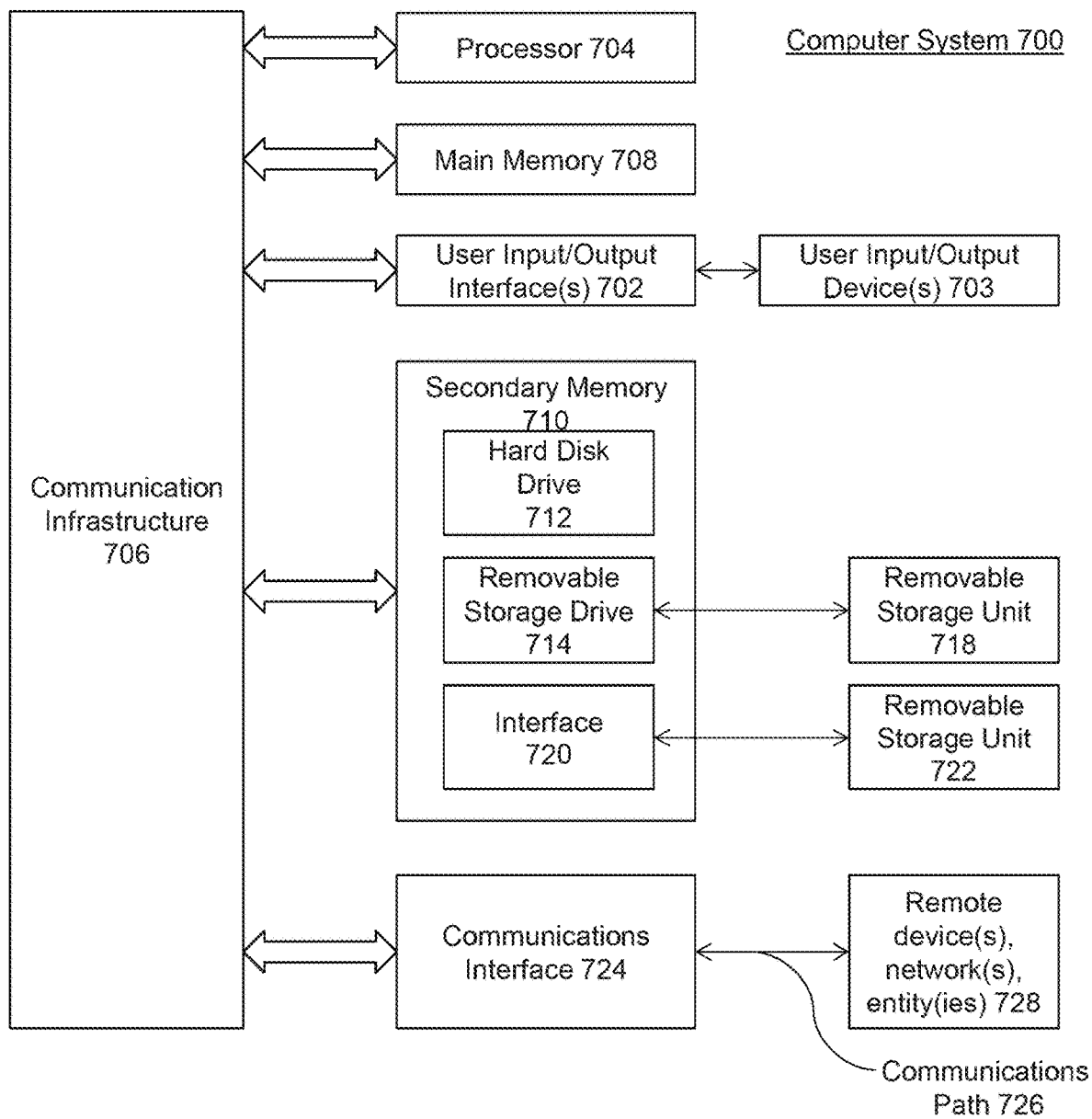
FIG. 7 illustrates an example computer system useful for implementing various embodiments.

As illustrated in FIG. 7, Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A system comprising:
a processor configured for executing operations in an analytics computing environment, a storage system operatively coupled to the processor, wherein the storage system stores data based on an ontology data model comprising a plurality of ontological models with one or more merged ontological elements, wherein the ontology data model defines one or more knowledge domains, and wherein the operations comprise:
receiving a request to execute an analytic workflow, wherein the analytic workflow comprises at least a first analytic application executable in a first analytics computing environment and a second analytic application executable in a second analytics computing environment, and wherein the first analytics computing environment and the second analytics computing environment are configured to communicate and execute by adapting to a common schema consistent with the ontology data model;
initiating a session for execution of the analytic workflow via a workflow component, wherein the workflow component is configured to compile, link, and execute the analytic workflow;
receiving executed results data of the execution of the analytic workflow; and
adapting the executed results data to the ontological model and transferring to the storage system.

2. The system of claim 1, wherein, for each application of the first analytic application and the second analytic application to be executed in the analytic workflow, an executive service application transmits a request to execute each application to a command and control service application.

3. The system of claim 2, wherein, in response to receiving the requests to execute each application in the analytic workflow, the command and control service application requests initiation of inputs for a respective one of the first analytic application and the second analytic application to be executed.

4. The system of claim 3, wherein the command and control service application requests the initiation of the inputs by requesting the storage system to transfer data identified by execution input information to the respective first analytics computing environment and the second analytics computing environment.

5. The system of claim 3, wherein the command and control service application requests initiation of the inputs by requesting an adapter to transfer analytics data identified to a respective one of the first analytics computing environment and the second analytics computing environment.

6. The system of claim 3, wherein the command and control service application requests execution of each application of the analytic workflow by transmitting a native access request to a respective one of the first analytics computing environment and the second analytics computing environment.

7. The system of claim 6, wherein, for each application to be executed in the analytic workflow, the command and control service application requests to transfer execution results of each application.

8. The system of claim 7, wherein the command and control service application transmits the request to transfer the execution results of each application to an adapter, and in response, the adapter is configured to transfer the execution results to the storage system.

9. The system of claim 8, wherein the command and control service application provides a response to the workflow component indicating completion of the execution of the analytic application.

10. A computer-implemented method, comprising:
creating, for an ontology datastore, an ontology data model comprising a plurality of ontological models with one or more merged ontological elements, wherein the ontology data model defines one or more knowledge domains;
receiving a request to execute an analytic workflow, wherein the analytic workflow comprises at least a first analytic application executable in a first analytics computing environment and a second analytic application executable in a second analytics computing environment, and wherein the first analytics computing environment and the second analytics computing environment are configured to communicate and execute by adapting to a common schema consistent with the ontology data model;
initiating a session for execution of the analytic workflow via a workflow component, wherein the workflow component is configured to compile, link, execute, and perform the analytic workflow;
receiving executed results data of the execution of the analytic workflow; and
adapting the executed results data to the ontological model and transferring to a storage system.

11. The computer-implemented method of claim 10, further comprising transmitting, for each application of the first analytic application and the second analytic application to be executed in the analytic workflow, a request to execute each application from an executive service application to a command and control service application.

12. The computer-implemented method of claim 11, further comprising requesting, by the command and control service application, initiation of inputs for a respective one of the first analytic application and the second analytic application to be executed in response to receiving the requests to execute each application in the analytic workflow.

13. The computer-implemented method of claim 12, further comprising requesting, by the command and control service application, execution of each application of the analytic workflow by transmitting a native access request to a respective one or the first analytics computing environment and the second analytics computing environment.

14. The computer-implemented method of claim 13, further comprising requesting, by the command and control service application, to transfer execution results of each application to be executed in the analytic workflow.

15. A tangible computer-readable device having instructions stored thereon that, upon execution by at least one computing device, cause the at least one computing device to perform operations comprising:

creating, for an ontology datastore, an ontology data model comprising a plurality of ontological models with one or more merged ontological elements, wherein the ontology data model defines one or more knowledge domains;

receiving a request to execute an analytic workflow, wherein the analytic workflow comprises at least a first analytic application executable in a first analytics computing environment and a second analytic application executable in a second analytics computing environment, and wherein the first analytics computing environment and the second analytics computing environment are configured to communicate and execute by adapting to a common schema consistent with the ontology data model;

initiating a session for execution of the analytic workflow via a workflow component, wherein the workflow component is configured to compile, link, execute, and perform the analytic workflow; and receiving executed results data of the execution of the analytic workflow; and adapting the executed results data to the ontological model and transferring to a storage system.

16. The tangible computer-readable device of claim 15, the operations further comprising:

transmitting, for each analytic application of the first analytic application and the second analytic application to be executed in the analytic workflow, a request to execute each application from an executive service application to a command and control service application.

17. The tangible computer-readable device of claim 16, the operations further comprising:

requesting, by the command and control service application, initiation of inputs for a respective one of the first analytic application and the second analytic application to be executed in response to receiving the requests to execute each application in the analytic workflow.

18. The tangible computer-readable device of claim 17, the operations further comprising:

transmitting, by the command and control service application, a request to transfer execution results of each application to an adapter; and in response, transferring, by the adapter, the execution results to the storage system.

19. The tangible computer-readable device of claim 18, the operations further comprising:

providing, by the command and control service application, a response to the executive service application indicating completion of the execution of a respective one of the first analytic application and the second analytic application.

20. The tangible computer-readable device of claim 19, the operations further comprising:

requesting, by the command and control service application, to transfer execution results of each application to be executed in the analytic workflow.

* * * * *